United States Patent [19]

McDevitt, Jr. et al.

[11] 4,007,990
[45] Feb. 15, 1977

[54] APPARATUS AND METHOD FOR MEASURING REFRACTIVE PROPERTIES OF A SPHERO-CYLINDRICAL OPTICAL SYSTEM

[75] Inventors: Howard I. McDevitt, Jr., Reston; Ronald F. Bax, Burke; Richard H. Body, Centreville, all of Va.

[73] Assignee: Acuity Systems, Incorporated, McLean, Va.

[22] Filed: May 23, 1975

[21] Appl. No.: 580,213

[52] U.S. Cl. .................... 356/124; 351/6
[51] Int. Cl.[2] .................... G01B 9/00
[58] Field of Search .......... 356/124, 125, 126, 127, 356/128; 351/6

[56] References Cited
UNITED STATES PATENTS

| 3,832,066 | 8/1974 | Cornsweet | 356/125 |
| 3,870,415 | 3/1975 | Cornsweet | 356/124 |
| 3,877,788 | 4/1975 | Sprague et al. | 356/125 |

Primary Examiner—John K. Corbin
Assistant Examiner—Conrad Clark
Attorney, Agent, or Firm—Cushman, Darby & Cushman

[57] ABSTRACT

Apparatus and method is disclosed for measuring refractive properties such as spherical power, cylindrical power, cylindrical axis, etc., which are potentially present in a sphero-cylindrical optical system. Relative movement is effected between an incident light beam and the optical system under test so as to cause the incident beam to effectively move about a pre-defined first locus in the plane of the optical system thereby producing a refracted light beam which moves correspondingly about a second locus in a subsequent plane parallel to the plane of the optical system. This second locus has relative maximum and minimum dimensions which are representative of refractive properties of the sphero-cylindrical optical system under test and a position-sensitive photoelectric detector surface is disposed in the path of the refracted light beam for producing an electrical output representative of the instantaneous relative position at which the refracted light beam strikes the position-sensitive photoelectric surface with electrical processing circuits being connected to receive this electrical output and to provide an output indication representative of at least one refractive property of the optical system under test.

80 Claims, 15 Drawing Figures

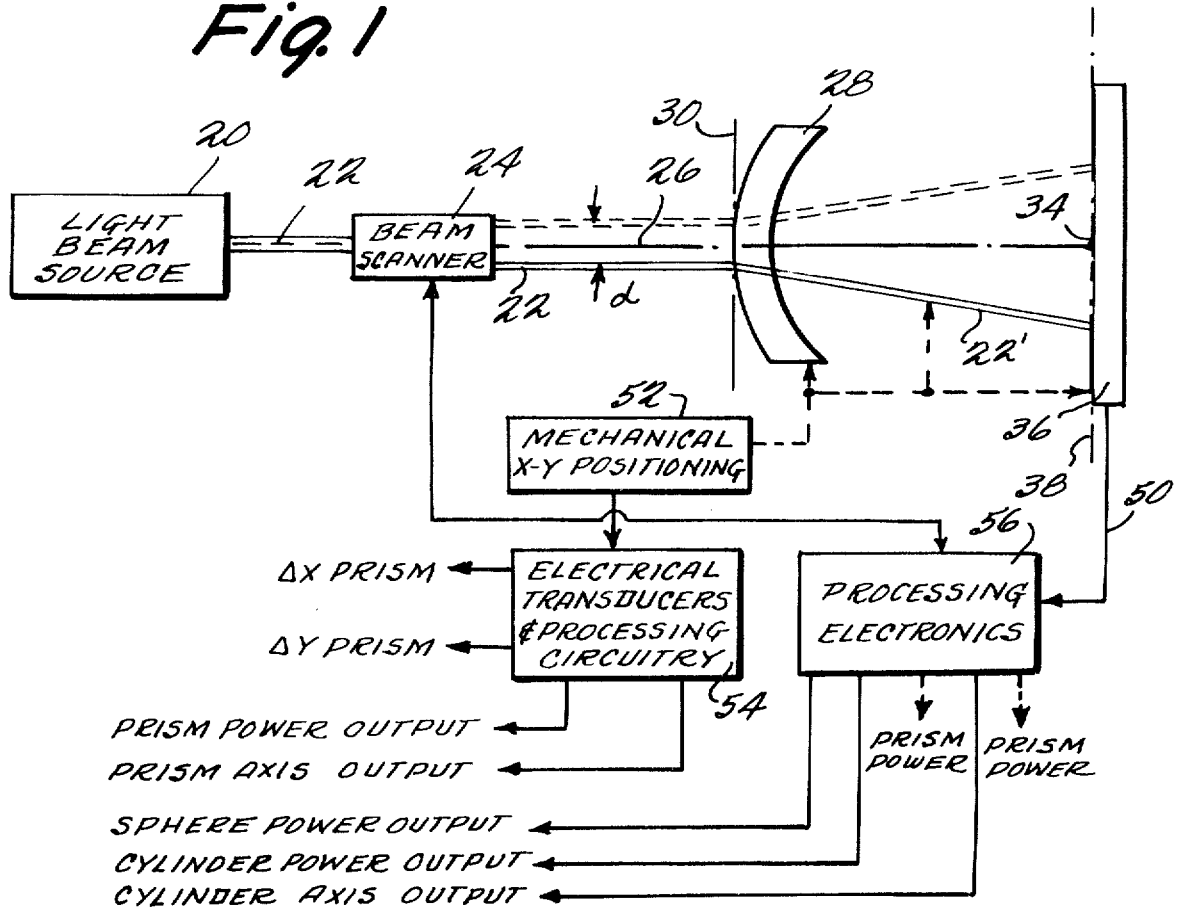
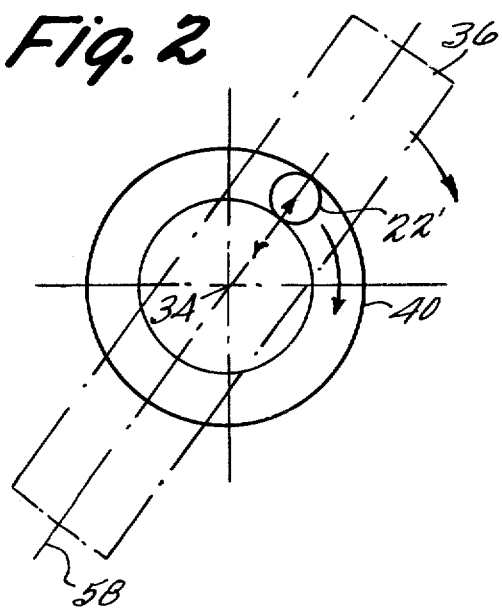
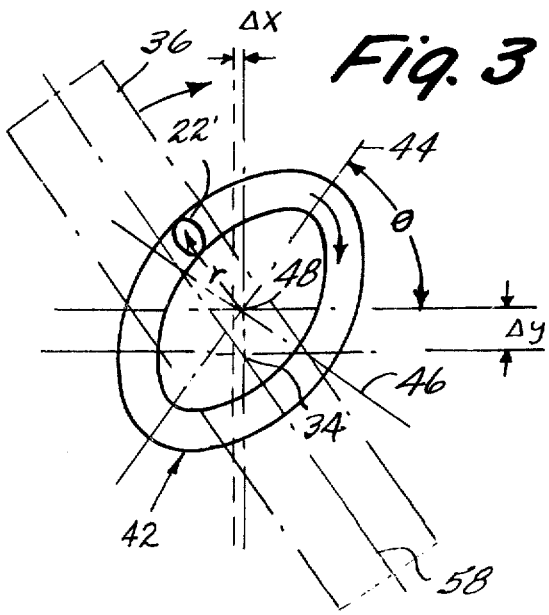

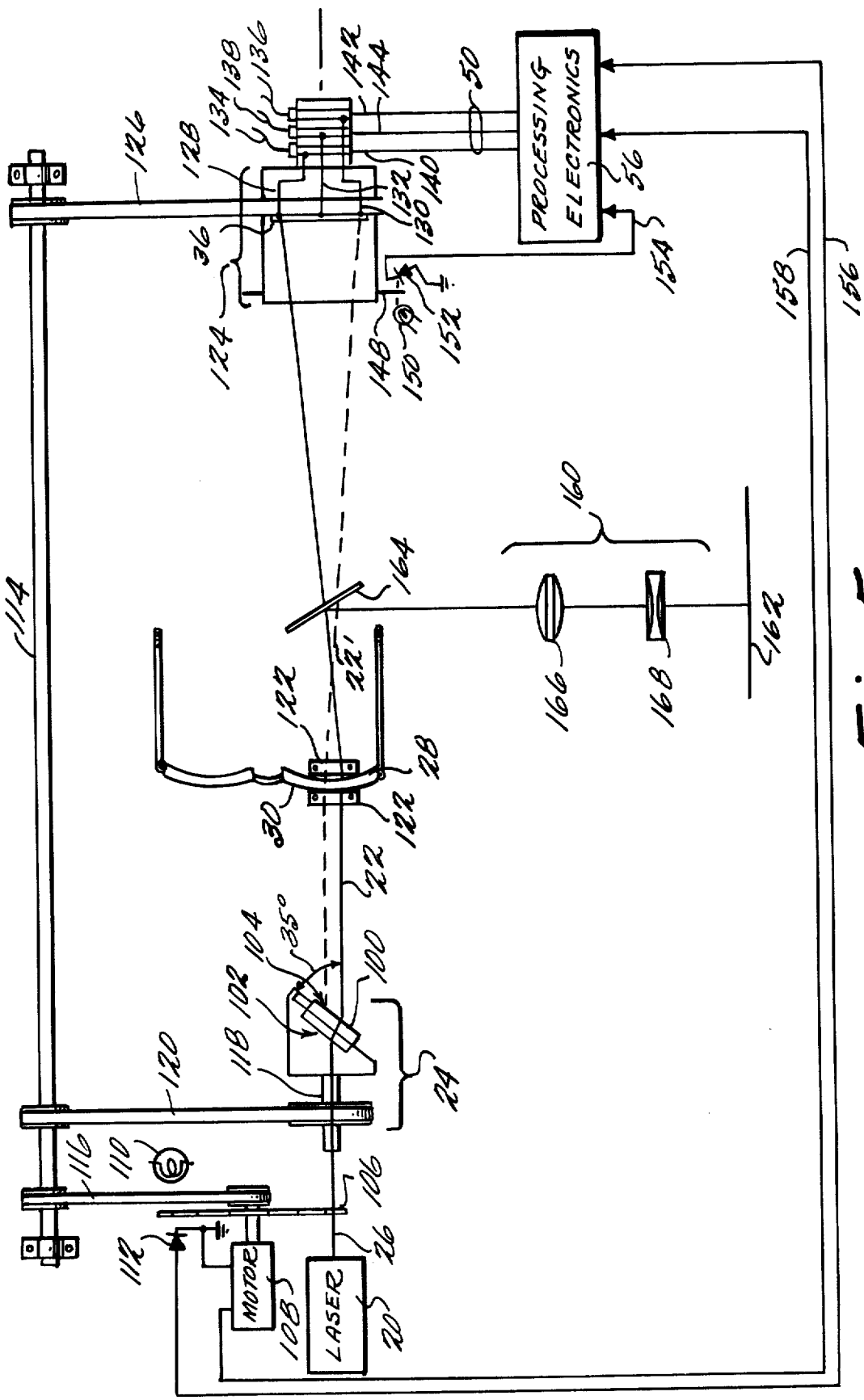

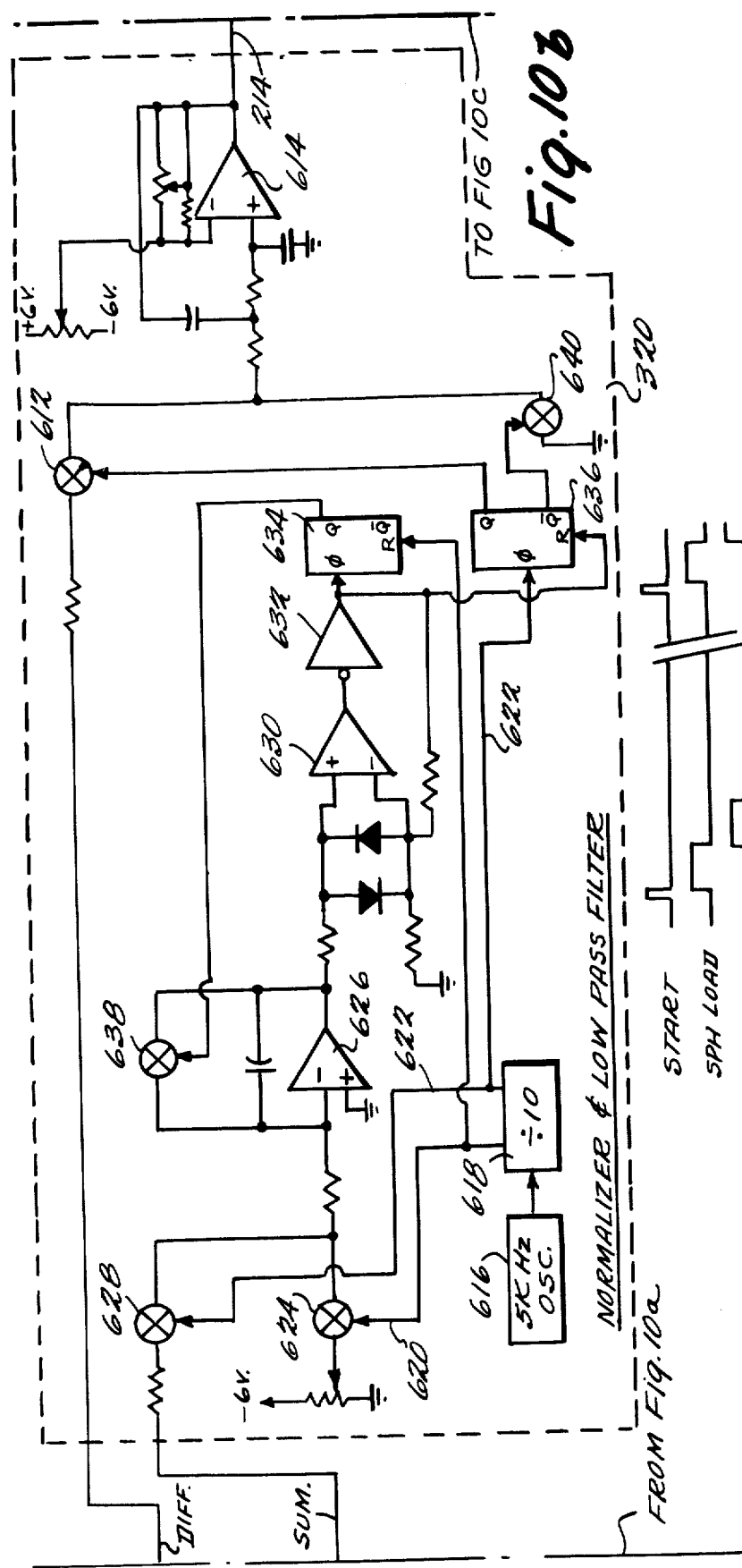
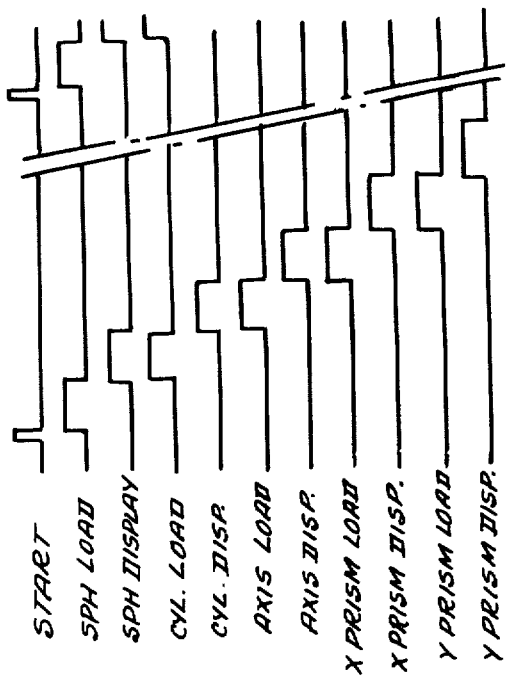
Fig. 10b
Fig. 9

APPARATUS AND METHOD FOR MEASURING REFRACTIVE PROPERTIES OF A SPHERO-CYLINDRICAL OPTICAL SYSTEM

This application relates generally to apparatus and method for measuring refractive properties of sphero-cylindrical optical systems. Typically, such refractive properties include at least one of the spherical power, cylindrical power, cylindrical axis and/or prism power and prism axis refractive properties which are potentially present in a generalized sphero-cylindrical optical system. In particular, this invention is concerned with sphero-cylindrical optical systems such as the human eye and spectacle lenses which are utilized in conjunction with the human eye. The presently preferred exemplary embodiment of the invention described in detail below relates specifically to apparatus and method for measuring the refractive properties of a spectacle lens and, accordingly, may commonly be referred to in the vernacular as a "lensmeter."

Prior apparatus and method for analyzing and/or measuring the refractive properties of sphero-cylindrical optical systems in general are known, for instance, as taught in prior issued U.S. Pat. No. 3,832,066 - Cornsweet issued Aug. 27, 1974 and U.S. Pat. No. 3,870,415 - Cornsweet issued Mar. 11, 1975, with both of these prior issued patents being commonly assigned herewith. Other prior art approaches will be apparent to those in the art. Some of these prior art approaches have resulted in highly sophisticated automatic equipment for analyzing the sphero-cylindrical refractive properties of the human eye. For example, an apparatus known as the AUTO-REFRACTOR is commercially available from the assignee of this application, Acuity Systems, Inc., McLean, Virginia.

While some of these prior approaches could be utilized for automatically measuring the sphero-cylindrical refractive properties of a spectacle or ophthalmic lens, various technical and/or economic constraints have so far prevented such apparatus from being commonly available in the commerical marketplace. Accordingly, even today, lensmeters available commercially and actually used in the industry depend upon subjective manual manipulations and judgments for operation. Typically, a conventional lensmeter involves moving a target until it appears focused to an operator on a projection screen or as directly viewed through an eyepiece. After such a subjective manual adjustment, the distance through which the target is moved or rotated is measured and proportionally related to the sphere power, cylinder axis, etc.

Now, however, with the discovery of the present invention, apparatus and method is provided for automatically and objectively measuring the refractive properties of a sphero-cylindrical optical system such as an opthalmic lens in a technically and commercially feasible manner. Such apparatus and method as described below in the presently preferred exemplary embodiment has actually been constructed and tested in the laboratory and will soon become available on the commercial market. This invention is believed to possess many technical and commercial advantages over any known prior apparatus and method for measuring refractive properties of sphero-cylindrical optical systems in general and, in particular, for measuring the refractive properties of an ophthalmic lens.

The presently preferred exemplary embodiment to be described in detail below provides a laser light beam source and a beam scanning mechanism for rotating the laser beam about a predetermined line axis at a predetermined rate such as $f_1$ revolutions per second. A conventional lens holder is provided for positioning the optical system under test in the path of this rotating light beam such that the beam is continuously swept about the locus of a circle within the plane of the optical system under test thereby producing a refracted light beam which correspondingly sweeps about the locus of an ellipse in a subsequent plane parallel to the plane of the optical system. As will be understood by those in the art and from the teachings of said prior issued U.S. Pat. No. 3,870,415, this elliptical locus will include major and minor axes having dimensions proportional to the maximum and minimum spherical power of the lens under test respectively. Accordingly, the average of the major and minor axes represents the average spherical power while the difference between the major and minor axes is proportional to the cylindrical power of the lens under test. The angular orientation of the major or minor axis with respect to the lens under test also defines the orientation of the cylinder axis parameter of the optical system under test. Furthermore, if the area of the lens being swept by the incident light beam includes prism refractive properties, the origin of the elliptical locus will be correspondingly offset from the optical axis of the apparatus by an amount proportional to the magnitude of the prism power and at an angle representing the orientation of the prism axis.

Accordingly, the relative dimensions of this elliptical locus and its relative orientation with respect to the optical system under test and/or with respect to the testing apparatus includes all of the information necessary for providing a quantitative objective measure of the spherical power (either maximum, minimum or average), cylindrical power, cylinder axis, prism power and prism axis refractive parameters of a generalized sphero-cylindrical optical system. It has now been discovered that it is particularly convenient and advantageous to utilize a photoelectric position-sensitive photo-detector disposed in the path of this refracted light beam for extracting such inherently encoded information therefrom by producing an electrical output from the photodetector representative of the relative position on its position-sensitive photoelectric surface at which the refracted light beam is intercepted and by subsequently electrically processing such an electrical output signal to provide an output indication representing one or more of the refractive properties of the optical system under test.

While the presently exemplary embodiment continuously sweeps a single laser light beam about a circular locus in the plane of the optical system under test, it should be appreciated by those in the art that other predetermined loci might be utilized and that rapid sequential switching of a single or even a plurality of such beams about the chosen locus may produce equivalent results. In fact, in the presently preferred exemplary embodiment, an optical chopper is utilized to amplitude modulate the incident light beam at a relatively high rate with respect to its effective rate of rotation. Synchronous demodulating circuitry subsequently removes this component of modulation from the photodetector output to result in a demodulated photodetector output that is substantially independent of ambient light variations and/or other spurious modulations of the photo-detector output signal. Thus, it will be appreciated that, in effect, even though the single incident beam in the preferred embodiment is continuously swept, it is substantially equivalent to the sequential switching or sequential actuation of one or more light beams.

Similarly, it should be appreciated that although the presently preferred embodiment causes the incident light beam to effectively sweep about a circular locus in the plane of the optical system under test, other predefined loci might also be used so long as such a predefined locus produces refracted light beam movements describing a second locus in a subsequent plane having relative maximum and minimum dimensions representative of the refractive properties to be measured in the optical system under test.

The electrical processing circuit utilized in the preferred exemplary embodiment extracts the inherently encoded information concerning the refractive properties of the optical system under test from the position-sensitive photo-detector output by synchronously processing that output in real time with respect to the relative motion then being effected between the incident light beam and the optical system under test although other processing circuits could also be utilized which are not actually real time processes.

Although two dimensional position-sensitive photo-detector devices are presently available commercially, it has been noted that the output from such two dimensional sensors is, at the present time, oftentimes nonlinear with respect to the actual physical position of a light beam falling thereon. In this regard, it may be noted that the output of such a position-sensitive photo-detector is representative of the geometrical position of the centroid of light energy distribution upon the surface of the photo-detector. Accordingly, in the case of a single cylindrical beam of light intersecting the surface of such a photo-detector at right angles thereto, the output of the photo-detector would be respresentative of the position of the beam axis on the photo-sensitive surface. Since, at the present time, the output of a two dimensional position-sensitive photo-detector is not sufficiently linear for straight forward usage, it has been discovered that a linear position-sensitive photo-detector in only one dimension may be utilized instead when such a one dimensional photo-detector is sychronously moved with respect to the relative motion being effected between the indicent light beam and the optical system under test. In the presently preferred exemplary embodiment, this is achieved by rotation of the linear position-sensitive one dimensional photo-detector synchronously with the sweeping rotational movements of the incident laser light beam such that the refracted light beam always falls somewhere along the length of the one dimensional position-sensitive photodetector provided that the detector width is great enough to accomodate the maximum usable cylinder power and decentering as explained more fully below. In effect, a one dimension photo-detector is caused to function as a two dimensional photo-detector by imparting to it another degree of freedom, namely, its synchronous rotation with the incident light beam being refracted thereonto.

Although not present in the presently preferred embodiment, for reasons of convenience and symmetry, it may also be desirable to cause the incident light beam to always converge toward a common point on the position-sensitive photo-detector surface in the absence of the optical system under test regardless of the rotational position of the incident beam. In this manner, a zero output indication may consistently be obtained whenever an optical system under test is removed from the apparatus.

As noted above, the prism power and prism axis is inherently encoded within the locus of the refracted beam. Especially in the case of a two-dimensional position-sensitive photo-detector, such prism power and prism axis information may be directly decoded from the output of the transducer. However, in the case of the presently preferred exemplary embodiment utilizing a one dimensional position-sensitive photo-detector, only a very limited amount of prism power can be tolerated on the photo-detector surface per se since the detector is of limited extent in any but the one dimension along which position information is given in its output. Thus, in the presently preferred exemplary embodiment, $x$ axis and $y$ axis adjustment mechanisms are provided for effectively translating the origin of the elliptical refracted locus to lie upon the single dimension of the position-sensitive photo-detector surface. Actually, the output of the photo-detector itself may aid in such adjustment by providing an indication whenever more than a predetermined acceptable amount of prism power is present.

Once the $x$ axis and $y$ axis adjustment mechanism has thus been properly adjusted to minimize the prism effect at the transducer surface, the magnitude of adjustment in $x$ and $y$ axis directions is then directly related to the prism power of the optical system under test in the $x$ and $y$ axis dimensions respectively. Accordingly, in the presently preferred exemplary embodiment, position encoding means are operatively connected to the $x$ axis and $y$ axis adjustment mechanism to provide $x$ axis prism output and $y$ axis prism output signals respectively representing the prism power of the optical system under test along these axes.

As previously mentioned, the presently preferred exemplary embodiment comprises sweeping the beam of incident light rays around the locus of a circle in the plane of the optical system under test at a predetermined rotational rate of $f_1$ revolutions per second. Under these conditions, the electrical processing circuitry of the presently preferred exemplary embodiment derives a composite electrical signal from the output of the position-sensitive photo-detector which has a d c or average component representative of the average spherical power of the optical system under test and a first a c component occurring at $2 f_1$ Hz with a magnitude representing the cylindrical power of the optical system under test. The phase of this first a c component with respect to the predetermined rotational $f_1$ motion of the incident beam then represents the cylindrical axis orientation of the optical system under test and processing means are provided for extracting such electrical parameters from the composite signal and associating such electrical parameters with quantitative measurements of the spherical power, cylindrical power and cylinder axis orientation of the optical system under test. A mode selection feature of the presently preferred exemplary embodiment permits a readout of either maximum or minimum spherical power as desired by adding or subtracting one-half the cylindrical power from the measured average spherical power.

Furthermore, the composite signal just described in the presently preferred exemplary embodiment also icludes a second a.c. component occurring at $f_1$ Hz and having a magnitude representing the prism power of the optical system under test. The phase of this second a.c. component with respect to the predetermined rotational movement of the incident beam will also define the prism axis parameter if desired. Although the presently preferred embodiment does not obtain prism power and axis directly from this $f_1$ Hz component, it does include processing circuitry for extracting information from this second a.c. component of the composite signal and providing an output signal representative of at least the magnitude of this second a.c. component. As previously discussed, when the one dimensional position-sensitive photo-detector of the preferred exemplary embodiment is utilized, such a prism output signal may be utilized to insure that the origin of the elliptical locus is effectively translated to lie along the position-sensitive dimension of the photo-detector. For example, an output indicator such as a light may be provided whenever the second $a$ $c$ component is detected as having a magnitude in excess of some predetermined limit value.

In the presently preferred exemplary embodiment, the absolute magnitude of output from the position-sensitive photo-detector may be influenced over a period of time by changes in the output from the light beam source, changes in the transmissivity of the optical path from the light beam source to the photo-detector, changes in electrical parameters, etc. Accordingly, it is preferred to normalize the position-sensitive output of the photo-detector by effectively dividing such output by the instantaneous sum of outputs from the detector representing the total light energy falling on the detector surface. In this manner, if the total light energy falling on the detector surface should fall, the magnitude of the position-sensitive output of the detector will automatically be increased to compensate therefor and vice versa.

As explained above, in the presently preferred exemplary embodiment, some of the refractive properties of the optical system under test are inherently encoded as the relative phase of an a.c. component of the composite signal representing the position-sensitive output of the photo-detector. A high Q narrow band pass filter or its equivalent is presently employed for extracting such a.c. component from the composite signal. However, such a filter inherently produces a significant phase change in the filtered signal unless the center frequency of the filter is exactly coincident or nearly so with the frequency of the a.c. component that is being extracted from the composite signal. Thus, in the presently preferred exemplary embodiment, a comb filter acting as a tracking band pass frequency filter is utilized. Comb filters are known to pass only a predetermined frequency and even harmonics thereof while strongly suppressing odd harmonies. If the predetermined pass frequency is $2f_1$, it also follows that $f_1$ is suppressed. This type of tracking band pass filter has an effective center band pass frequency which is automatically adjusted in synchronism with the relative motion between the incident light beam and the optical system under test so as to substantially coincide with the $2f_1$ frequency of the first a.c. component even if $f_1$ should vary from time to time due to changes in motor speed, electrical parameters, etc. Thus, phase changes which would otherwise occur in the extracted first a.c. component of the composite signal are minimized before phase comparison with a reference synchronization signal to extract information relative to a refractive property in the optical system under test, e.g., cylindrical axis information.

The analog electrical signals representative of the refractive properties of the optical system under test could be read out directly as a measurement of such refractive properties such as on an oscilloscope display, on calibrated meter displays, on recording pin chart displays, etc. However, in the presently preferred exemplary embodiment, such analog electrical signals are sequentially sampled on a repetitive basis, converted from analog to digital electrical signals to respectively represent numerical data which, in turn, quantitatively represent the refractive properties of the optical system under test. Such digital data is then stored in a series of digital data registers respectively corresponding to the various refractive properties that are potentially present in the optical system under test. As will be appreciated, the contents of such digital registers is periodically updated as the analog signal for that respectively associated parameter is periodically sampled and converted to digital data. The contents of the digital registers are then decoded and used to drive conventional digital display panels or digital printer mechanisms to actually visually indicate and/or record the measured refractive properties of the optical system under test.

A special type of digital phase detector is also utilized in the presently preferred exemplary embodiment to insure a correct phase indication even when the two signals being compared are exactly coincident. Circuitry is also provided to eliminate a possible 180° ambiguity in the readout of the cylinder axis parameter.

These and other objects and advantages of the invention will become more apparent and more readily appreciated from the following detailed description of the presently preferred exemplary embodiment of the invention taken in conjunction with the accompanying drawings, of which:

FIG. 1 is a simplified elevational view of the presently preferred exemplary embodiment of this invention;

FIG. 2 is a schematic illustration of the locus of the refracted beam on the one dimensional position-sensitive photo-detector used in the FIG. 1 embodiment for an optical system having only spherical power;

FIG. 3 is a schematic representation of the locus of the refracted beam along the one dimensional position-sensitive photo-detector of FIG. 1 for an optical system having all of the five potential refractive parameters of a sphero-cylindrical optical system;

FIG. 5 is a more detailed plan view of an optical schematic exemplary embodiment;

FIG. 9 is a timing diagram useful in understanding the operation of the digital circuitry shown in FIG. 8c; and FIGS. 10a – 10d are detailed schematic circuit diagrams of the processing electronics of the presently preferred exemplary embodiment shown in FIGS. 5–9.

Figure 4:
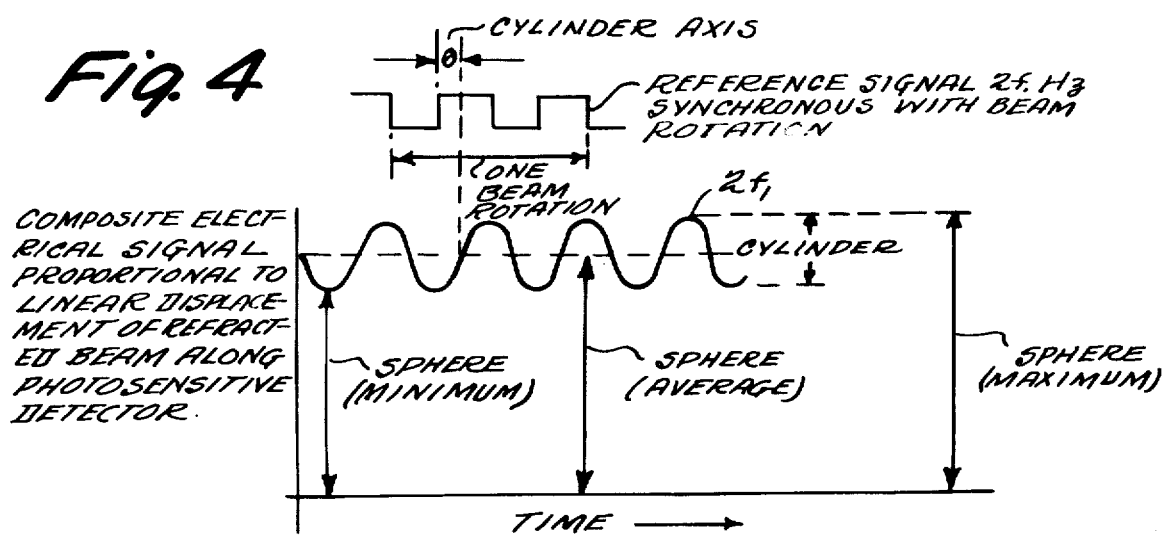
FIG. 4 is a diagram generally showing the expected waveform of a composite signal derived by the processing electronics of FIG. 1 from the position-sensitive photo-detector shown therein.

Referring first to FIGS. 1–4, a light beam source 20 is shown as generating a light beam 22. The light beam 22 is, in turn, acted upon by the beam scanner 24 to cause the light beam 22 to sweep out a volume of revolution having an inside diameter ($d$) about the optical axis 26 of the apparatus. In the preferred exemplary embodiment, the optical axis 26 of the apparatus coincides with the axis of the light beam 22 as it issues from the laser source 20 and is also coincident with the optical axis of the lens or other sphero-cylindrical optical system 28 under test. As has been mentioned earlier, in this embodiment, the incident light beam 22 sweeps out the locus of a circle in the plane 30 of the optical system 28 under test.

A position-sensitive photo-detector 36 is positioned with its photo-sensitive surface in a subsequent plane 38 whereat the refracted light beam 22' describes a second locus having relative maximum and minimum dimensions representative of the refractive properties of the sphero-cylindrical optical system 28 under test. In the case of an optical system 28 having only spherical power, the refracted light beam 22' will describe the locus of a circle 40 as shown in FIG. 2. Furthermore, this circular locus 40 will be centered on the optical axis 26 at point 34 in plane 38.

However, in the case where the optical system 28 under test includes both cylinder and prism power in addition to spherical power, the locus of refracted beam 22' in plane 38 will be an elliptical locus 42 as shown in FIG. 3. Because the lens now has cylindrical power, the refracted beam 22' will describe an elliptical locus having a major axis 44 and a minor axis 46 representative of the maximum and minimum spherical power of the lens, respectively. Accordingly, the difference between the major axis and the minor axis dimensions represents the cylindrical power of lens under test. Furthermore, the physical angle of the elliptical axes with respect to the optical system under test and/or with respect to the apparatus represents the orientation of the cylinder axis for the cylinder component of power in the optical system 28 under test. Finally, if the optical system 28 under test also includes prism power, then the origin 48 of the elliptical locus 42 will be offset (e.g., $\Delta x$, $\Delta y$) from the point 34 in plane 38 on the optical axis 26 of the apparatus by an amount proportional to the prism power of the optical system under test and in a direction along the prism axis of that power.

The electrical output or outputs from the position-sensitive photo-detector 36 at 50 either directly or indirectly supplies a composite electrical signal representing the geometry of the refracted beam 22' locus on the photo-sensitive surface of the photo-detector in plane 38, thereby inherently containing all of the information necessary to determine the refractive properties of the optical system under test.

In the preferred exemplary embodiment, this composite electrical signal is related to the radius $r$ of the centroid of the beam 22' from the point 34 on the optical axis 26 of the apparatus. Assuming for the moment that the origin of the elliptical locus 42 is substantially coincident with the optical axis 26 of the apparatus, it should now be appreciated that such an electrical signal as represented in FIG. 4 will contain a DC component proportional to the average spherical power of the lens under test. The minimum spherical power and maximum spherical power properties are proportional to the minima and maxima of this electrical signal, respectively, while the cylinder power of the system under test is proportional to the difference between the maximum and minimum values of such an electrical signal. It will be observed that the a.c. component representing the cylinder power of the lens will occur at twice the rotational frequency of the refracted beam 22' since a complete rotation of the beam 22' will produce two complete cycles of oscillation for the dimension of radius r. At the same time, the relative phase between this first a.c. component of the composite signal and a reference signal occurring at $2f_1$ Hertz in synchronism with the rotation of refracted beam 22' will define the cylinder axis angle data.

If the axis of the elliptical locus 42 is deflected away from the optical axis 26 of the apparatus by a significant amount, then a further component of modulation will occur at a frequency $f_1$ Hertz on the composite signal shown in FIG. 4 since for each complete rotation of the refracted beam 22' there will occur a complete cycle of superimposed minimum/maximum excursions of dimension r due to this offsetting of the ellipse origin. The magnitude such as a second ac component at $f_1$ Hz will be proportional to the magnitude of prism power in the lens under test while the phase of this second ac component with respect to the rotation of beam 22 will define the relative prism axis angle as should now be apparent.

However, it is preferred that the origin of the elliptical locus 42 actually substantially coincides with the optical axis 26 and, accordingly, mechanical $x$ axis and $y$ axis translating or positioning mechanism 52 is provided for effectively translating the origin of the elliptical locus 42 by $\Delta x$, $\Delta y$ amounts to coincide with the optical axis 26. As may be appreciated, such relative mechanical movement may be effected by actually moving the optical system 28 under test or by shifting the refracted beam 22' (e.g., through a system of movable mirrors) or by actually physically moving the effective axis of the position-sensitive photo-detector 36. The amount of $\Delta x$ axis and $\Delta y$ axis translation required for such location of the elliptical locus origin substantially at the optical axis 26 is sensed by electrical transducing and processing circuitry 54 which, in turn, provides an output display of $x$ axis and $y$ axis prism power which, of course, could be resolved into an overall prism power and prism axis orientation if desired. The composite electrical signal as shown in FIG. 4 is provided either directly or indirectly as electrical output 50 from the position-sensitive photo-detector 36 to processing electronics 56 which, in synchronism with the beam scanner 24, processes the composite signal to extract the information concerning the refractive properties of the optical system 28 inherently encoded within such a composite signal as shown in FIG. 4 and to provide a display of sphere power, cylinder power and cylinder axis. Prism power and prism axis may also be decoded and displayed from the composite signal as indicated above.

While the position-sensitive photo-detector 36 of FIG. 1 may be a two dimensional position-sensitive photo-detector providing outputs in both $x$ and $y$ axis directions, the presently preferred exemplary embodiment utilizes a one dimensional linear position-sensitive photo-detector which provides an output indicative of position only along a single axis 58. This one dimensional position-sensitive photo-detector is then rotated about the optical axis 26 in synchronism with the rotation of the light in 22 or thereabout. Accordingly, so long as prism power is properly compensated for with the mechanical $\Delta x$, $\Delta y$ positioning means 52, the refracted light beam 22' will always fall within the active area of the one dimensional photo-detector 36 provided that the width of the photo-detector is great enough. That is, there is still a practical limitation in that the refracted beam 22' will be deflected off the center line 58 of the one dimensional photo-detector 36 by an amount proportional to the cylinder power and the angular misalignment of the cylinder axis from the center line 58. Thus, the active area of detector 36 should have a width proportional to the maximum cylinder power that is to be measured by the apparatus.

A suitable one dimensional position-sensitive photo-detector is available as model No. PS-100 from Quantrad Corporation, 2261 South Carmelina Avenue, Los Angeles, California. It has an active area approximately two inches in length and 0.16 inch in width, requires but a single bias voltage and provides an output voltage from a lead at either end of the active area. The difference between the currents from the end leads represents the position of the centroid of light energy distribution striking the active area while the summation of these currents represents the total amount of light energy striking the active area regardless of its relative position therealong.

A schematic representation of the optical-mechanical layout of the presently preferred exemplary embodiment is shown in FIG. 5. It will be recognized by those in the art that an actual commercial embodiment may differ from such a schematic representation due to the utilization of folded light beams, etc. for economically fitting all the required optical and mechanical apparatus within the design constraints of a particular commerical embodiment.

As shown in FIG. 5, the beam 22 from laser 20 is caused to scan the locus of a circle in plane 30 by passing the laser beam 22 through an inclined rotating glass disc 100. The glass disc 100 has substantially parallel faces 102 and 104 which faces are inclined at an angle with respect to the optical axis 26. As shown in FIG. 5, the laser beam 22 is refracted radially away from the optical center line 26 at the first interface 102 and then refracted back toward the center line 26 at interface 104. The laser 20 should preferably have a relatively small diameter beam 22 (e.g. 0.6 – 1.0 mm.), a small beam divergence (e.g. equal to or less than approximately 1 milliradian), a power of approximately 0.5 milliwatts or greater and should be relatively clean (spatially). To reduce possible spurious effects of ambient light, etc., the laser beam is preferably chopped at a predetermined frequency with this frequency of amplitude modulation being removed by appropriate synchronous demodulating circuits in the processing electronics 56. In the exemplary embodiment shown in FIG. 5, the laser beam is chopped by a multi-bladed mechanical chopper 106 turned by a motor 108 revolving at a predetermined speed. The chopper 106 also modulates light coming from a light source 110 and detected by a light detector 112 to provide an electrical signal therefrom in synchronism with the chopping frequency of the chopping blade 106.

The motor 108 also drives a shaft 114 through a timing belt 116. The drive shaft 114, in turn, rotates the glass disc 100 mounted in hollow housing 118 which is rotatably mounted about the center line 26 and driven from the drive shaft 114 through timing belt 120. As a purely nonlimiting example, it may be noted that the glass disc 100 may be 1 inch in diameter and 0.42 inch thick oriented at a 35° angle with respect to the optical axis 26. The thickness and angular inclination of the glass disc 100 determines the diameter of the scanning circle at plane 30. In practice, the diameter of such a scanning circle plus the diameter of laser beam 22 should preferably be less than about 5 millimeters. Since the laser beam 22 will have a diameter of approximately 1 mm, it follows that the preferred scan beam diameter for the circular locus should be approximately 4 mm. As another example, if the glass were inclined at 45° with respect to the optical axis 26, the glass disc thickness should be approximately 0.24 inches for refractive index of 1.517.

As previously noted, the surfaces 102, 104 of disc 100 are essentially parallel such that the scanning beam 22 leaving the disc 100 is essentially parallel to the incident beam and to the optical axis 26. However, it may be desirable for convenience and symmetry purposes to have a zero dimension diameter for the resulting scanned circle locus at the detector 36 in the case where there is no optical lens 28 present. In the presently preferred exemplary embodiment, the optical distance between the glass disc 100 and the detector 36 is approximately 25 cm, therefore, if desired, the disc 100 should introduce approximately ½° deviation or inclination in the scanned beam toward the optical axis 26 to achieve this desired symmetry. In such case, the angle between the front and rear surfaces 102, 104 of disc 100 should be approximately 1°.

The opthalmic lens 28 under test is supported in the embodiment shown in FIG. 5 between a conventional spring loaded lens holder means 122 and a conventional lens table which simply functions to hold the lens stationary with the optical axis of the lens under test being approximately aligned with the optical axis 26 of the apparatus.

The one dimensional position-sensitive photo-detector 36 is mounted in the rear of a hollow drum 124 which is also driven from drive shaft 114 through a timing belt 126. The drive gear ratios are chosen such that the beam scanner apparatus 24 is driven synchronously and at the same speed as the one dimensional linear position-sensitive photo-detector 36. As shown in FIG. 5, the end detector leads 128, 130 and the bias connector lead 132 are connected to slip rings 134, 136, 138 on which brushes 140, 142, 144 make moving electrical connection as the drum 124 rotates thereby providing the photo-detector output at 50 which leads to the processing electronics 56.

In the preferred exemplary embodiment shown in FIG. 5, the outer circumference of drum 124 or other suitable synchronously rotating means comprises a quadrant chopper 148. Light from a light source 150 is thus chopped onto a light detector 152 to provide an electrical signal in synchronism with the 2 $f_1$ Hz rotation of the incident light beam 22, the refracted light beam 22', and the photo-detector 36, etc. Of course, other position transducing arrangements for generating such synchronization signals at 2$f_1$ Hz could be utilized as will be appreciated. In the preferred exemplary embodiment, the 2 $f_1$ Hz synchronization signals from detector 152, the chopper synchronization signal from detector 112 and the motor drive or speed control are all interfaced with the processing electronic 56 via lines or connections 154, 156 and 158, respectively.

The size of the one dimensional linear position-sensitive photo-detector is primarily governed by the geometry of a particular optical-mechanical layout. In the case of a parallel faced glass disc 100, the laser beam 22' will strike the photo-detector 36 approximately 2 mm from its rotational axis when no lens 28 is in place. It will focus at the rotational axis with a lens having a focal length equal to the lens-detector separation. If that distance is 200 mm, the five diopters (one meter/200 mm) equals 2 mm displacement along the axis 58 of the transducer 36. Thus, for a lens capable of measuring optical systems within the limits of ±20 diopters, the required length for the active axis of the photo-detector 36 would be 16 mm plus an extra amount to cover beam spot size and detector effects, etc. The beam spot size actually increases by the incident laser beam diameter for each 5 diopters of power for the optical system 28. Accordingly, for a minus 20 diopters lens 28, the beam spot size actually present on the detector 36 surface would be about 5 mm. Therefore, the detector 36 should have a length of at least 21 mm and probably at least 30 mm when edge effects are taken into consideration. A detector having 50 mm by 4 mm active area has been successfully used and is readily available commercially. Mathematical analysis would indicate a need for a detector having a width in excess of 4 mm due to decentering, the cylinder power deflection if the cylinder axis is not aligned properly and beam spot size increases caused by the action of lens 28. However, it has been discovered that the 4 mm width functions acceptably.

As also shown in FIG. 5, a conjugate optical path 160 is defined perpendicular to the main optical axis 26 of the apparatus for generating a visual display 162 to assist in properly positioning the lens 28 within the lens holder 122. A pellicle beam splitter 164 is placed in the path of beam 22' at a 45° angle to the optical axis 26. A portion of the beam 22' proceeds directly on toward the detector 36 previously described. However, a reflected portion of beam 22' is directed toward a positive lens 166 (e.g. 36 mm diameter and 85 mm focal length) and a negative lens 168 (e.g. 33 mm diameter and −29 mm focal length) separated by a predetermined distance (e.g. 2.5 inches). The light passing along path 160 is directed against the diffuse mylar display screen 162 or other suitable display screen located a predetermined distance from lens 168 (e.g. 3.25 inches) upon which the operator may directly view the locus of refracted light beam 22' as it is rotated by the rotating mechanism scanning 24. Screen 162 may preferably have reference markings such as concentric circles or a centered cross, etc. to aid the operator in accurately positioning the lens 28 in lens holder 122 such that the optical axis of the lens 28 is approximately aligned with the optical axis 26 of the apparatus.

Figure 6:
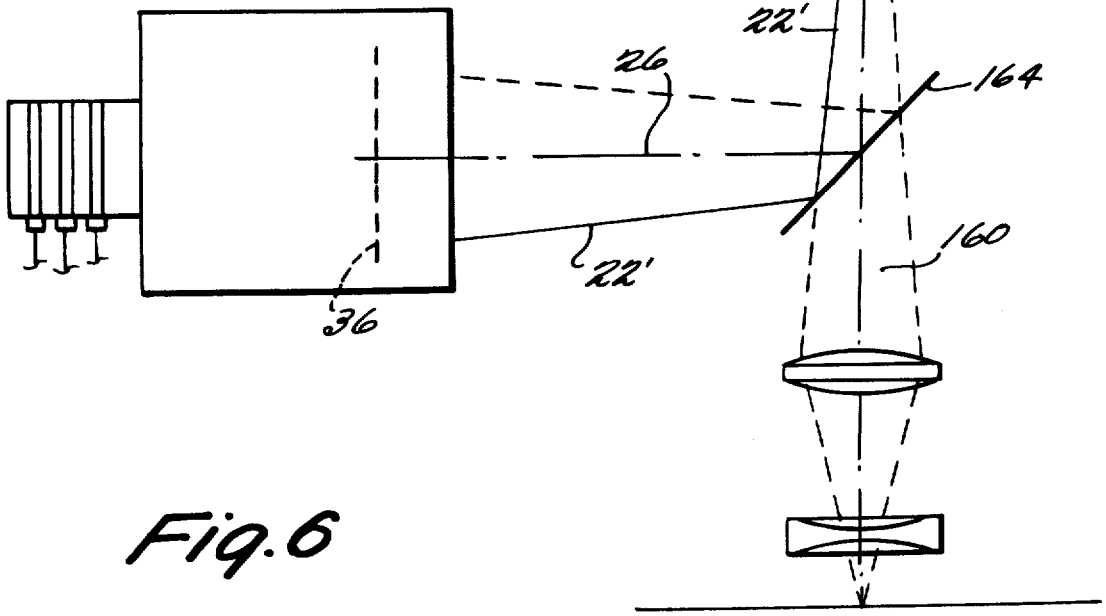
FIG. 6 is a schematic plan view of the presently preferred exemplary embodiment slightly modified from the FIG. 5 embodiment to provide for $x$ axis and $y$ axis prism power compensating adjustments.

FIG. 6 shows one possible modification of the embodiment shown in FIG. 5 including apparatus for providing prism compensation. The incident light beam 22 is refracted by lens 28 into a refracted beam 22'. However, rather than letting refracted beam 22' proceed on directly to the detector 36, the refracted light beam is folded by a mirror surface 200 toward the pellicle beam splitter 164. In the FIG. 6 embodiment, the light passed by the pellicle beam splitter 164 actually passes along the conjugate path 160 while the refracted light from pellicle beam splitter 164 passes about the main optical axis 26 of the apparatus, which main optical axis has now been effectively folded by mirror 200 and pellicle beam splitter 164 as may be seen in FIG. 6. The mirror surface 200 is gimballed as at 202 such that it can be rotated in both a horizontal and vertical direction sense by positioning means such as thumb screws 204, 206. Such movements will cause the refracted light beam 22' to be translated in the plane of detector 36. Rotation of 204 will cause downward movement as viewed in FIG. 6 while rotation of thumb screw 206 will cause the mirror 200 to tilt about an orthogonal axis producing movement of the refracted light beam 22' above or below the plane of FIG. 6. Also shown are potentiometers 208, 210 used for generating electrical signals representing the magnitude of adjustments effected by thumb screws 204, 206. As previously explained, such adjustments in the $x$ and $y$ directions are used to translate the origin of the elliptical locus in the plane 38 so as to fall within acceptable tolerances of the center line 58 of the detector 36 along its axis. The magnitude of adjustment of thumb screws 204 and 206 is directly related to the translation effected on the $x$ and $y$ axes, respectively.

Figure 7:
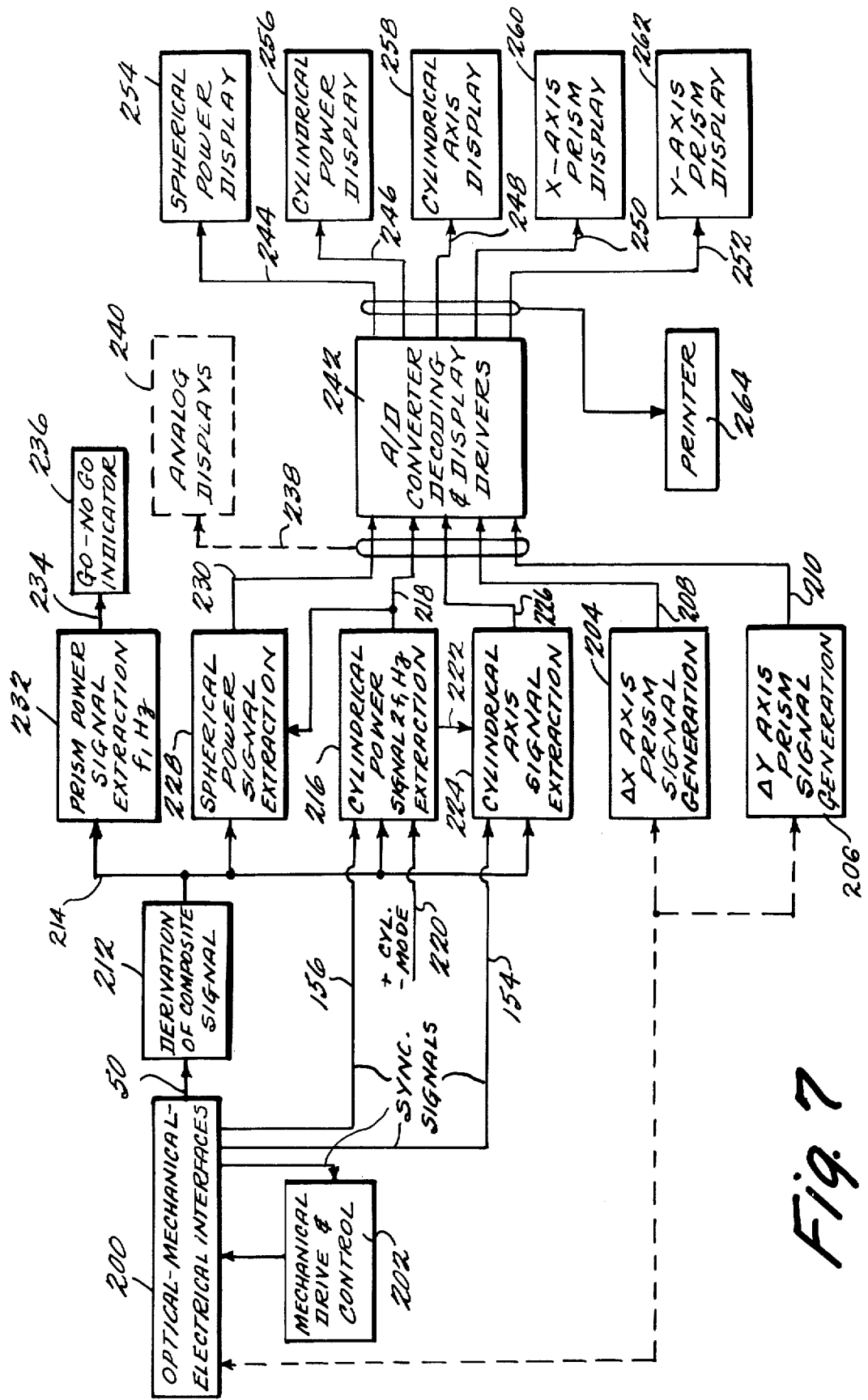
FIG. 7 is a functional block diagram of the presently preferred exemplary embodiment shown in FIG. 5.

A more detailed functional block diagram of the presently preferred exemplary embodiment of the invention is shown in FIG. 7. Here, the optical-mechanical-electrical interfaces previously described are generally shown at 200. The information bearing electrical output of the position-sensitive photo-detector is shown at 50 as before while the generated electrical synchronizing signals are output on lines 154, 156 as previously described. The moving elements of the optical-mechanical-electrical interfaces 200 are driven by a mechanical drive and control means 202. The $\Delta x$ and $\Delta y$ axis prism adjustment and signal generation means 204, 206 are mechanically linked to the optical-mechanical-electrical interfaces 200 as shown by dotted lines in FIG. 7 so as to effectively translate the origin of the refracted elliptical locus to the center line of the apparatus as previously discussed while producing analog signals at 208, 210 representing the $x$ axis prism and $y$ axis prism components of the optical system under test.

If the output from the photo-detector at 50 is not already in the form of the desired composite electrical signal as shown in FIG. 4, then it is processed at 212 to derive such as composite electrical signal on line 214. The first ac component at $2 f_1$ Hz is extracted from this composite signal in channel 216 to produce an analog ouput at 218 representing positive or negative cylinder power according to the convention selected by the ± cylinder mode input to selector 220. The output at 218 represents the magnitude of the ac component at $2 f_1$ Hz. This ac component may be fed via line 222 to a phase sensitive cylinder axis signal extraction channel 224 which compares this signal phase with the phase of a synchronization signal on line 154 to produce an output on line 226 having an analog magnitude representative of the cylinder axis orientation of the lens under test. The first ac signal component at $2 f_1$ Hz may also be independently extracted from the composite signal on buss 214 if desired.

The average or dc component of the composite signal on buss 214 is extracted in channel 228. One-half of the cylinder power on line 218 is added or subtracted to that average level (depending on the ± cylinder mode input at 220) to result in an output signal on line 230 having an analog magnitude representing the maximum or minimum spherical power respectively of the optical system under test.

To facilitate the relative positioning of the lens and/or to insure that substantially all of the prism power of the lens is reflected by the x axis and y axis adjustments at 204, 206, a prism power signal extraction channel 232 is provided to produce an analog signal at 234 having a magnitude proportional to the residual prism power of the lens under test as seen by the photo-detector output at 50. This analog signal at 234 may then be used to drive a "go-no-go" indicator at 236 or the like for indicating when the residual prism power is within acceptable limits (i.e., minimized to less than a preset level) indicating that the other analog outputs on lines 208, 210, 218, 226, and 230 are correct analog representations of the respectively corresponding refractive properties of the lens under test.

The analog outputs from the various measurement channels in FIG. 7 may be connected as shown by dotted line 238 to a set of analog displays 240 for directly indicating the measured refractive properties of the lens under test. However, in the preferred embodiment, these analog signals are presented at 242 to an analog/digital converter, decoding and display drivers which produce respectively corresponding digital signals on ouput lines 244, 246, 248, 250 and 252 for driving display units 254, 256, 258, 260 and 262 as shown in FIG. 7. In addition, these digital outputs may be input to a digital printing mechanism 264 for permanently recording the measured refractive properties of the optical system under test.

It will also be understood that the analog signals shown in FIG. 7 could be converted to digital data at an earlier stage if desired with the information being extracted and displayed using digital data processing techniques from such an earlier stage onward.

FIG. 8 is substantially similar to FIG. 7 except that more detail is shown. It will be noted that light from the laser source 20 passes through the chopper wheel 106 where it is periodically interrupted as a 960 Hz rate. The chopped light beam is routed through an offsetting inclined glass plate scanner 24 rotating at 10 Hz. The correspondingly rotating refracted light beam passing through the lens under test 28 impinges upon the synchronously rotating linear position-sensitive photo-detector 36 which is also rotating synchronously at 10 Hz. As previously mentioned, the one dimensional photo-detector 36 in this particular embodiment provides two electrical outputs which are passed via slip rings 200a to dual preamplifier channels at 300, 302 comprising two operational current-to-voltage translators. The preamplifier outputs are then connected to difference and sum amplifiers 304, 306 where the output of the difference amplifier is a 960 Hz square wave having amplitude and phase (relative to a 960 Hz reference signal) representing the relative position of the beam spot 22' as it strikes the linear position-sensitive detector 36. The output of the sum amplifier is similarly a 960 Hz square wave but having an amplitude corresponding to total light energy falling on the linear position-sensitive detector regardless of its position on the detector's photo-sensitive surface.

The sum and difference signals are coupled to two identical high pass filters 308, 310 which substantially suppress signals in the 0–120 Hz range, thereby reducing possibly spurious effects of drift, interference due to stray light, etc. The filtered 960 Hz sum and difference signals are then individually synchronously demodulated at 312, 314 with respect to the zero crossing detector 316 output from the sum channel. Each demodulator 312, 314 includes a 200 Hz low pass filter to remove any residual traces of the 960 Hz modulation. The output of the sum demodulator 314 is thus a unidirectional analog voltage corresponding to the instantaneous total light energy falling on the active surface of the position-sensitive detector at any given time. Similarly, the output of the difference demodulator 310 is a bidirectional voltage corresponding to the instantaneous position of the refracted light beam 22' on the active surface of the linear positon-sensitive photodetector 36.

Accordingly, the output of the difference demodulator 312 contains the desired spherical and cylindrical power and cylindrical axis information. The peak output on the difference channel will occur at a level representing the peak spherical power of the lens and will occur twice during each revolution of the position-sensitive photo-detector 36 which, in this exemplary case, would be 20 Hz. Similarly, the minimum output in the difference channel represents the minimum spherical power and also occurs twice during each revolution of the photo-detector 36. The difference between the maximum and minimum levels on the difference channel then corresponds to the astigmatism or cylindrical power of the lens 28 under test. The phase of this 20 Hz component of the composite signal output of demodulator 312 relative to a 20 Hz synchronization reference signal represents the relative orientation of the cylinder power axis.

The reference signal for both demodulators 312, 314 is obtained by noting the zero crossings of the sum channel 960 Hz ac signal from channel high pass filter 310. The output of the zero crossing detector 316 is, accordingly, a 960 Hz square wave used for clocking the demodulator switches.

A drop-out detector 318 is also provided. This detector is sensitive to the magnitude of the sum channel 960 Hz ac signal and provides an output whenever the level of this signal is less than a predetermined value required for proper performance. The output of the drop-out detector may be used to drive an indicator calling the operator's attention to this problem or, alternatively, the drop-out detector may automatically deactivate the apparatus such as by deactivating the computation, power supply or output display modules, etc.

Due to variations in the intensity of the beam 22' falling on photo-detector 36 due to causes such as changing laser output levels, decreased transmissivity of the lens under test, etc., the composite output signal from the difference demodulator 312 is inherently multiplied by an undesired intensity term related to the then existing instantaneous light intensity of the refracted beam 22'. To compensate for this undesired multiplication, a normalizer 320 is employed for effectively dividing the output of difference demodulator 312 by the output of the sum channel. The normalizer is a dual slope integrating pulse with modulator which will be explained in more detail in conjunction with FIG. 10b.

On the spherical power channel, the resulting normalized composite signal at 322 is fed through a 1 Hz low pass filter 324 to remove any 10 or 20 Hz modulation components. The output of the low pass filter 324 is then amplified and scaled at 326 to become the mean, or average sphere power. In addition, ½ of the ± cylinder power signal may also be added at 326 to the average sphere power to result in an output for sphere power on channel 228 representing the maximum spherical power or minimum spherical power as desired of the lens 28 under test.

The normalized composite output at 322 is also connected in the cylindrical power channel 216 to a 4 pole, 30 Hz low pass filter 328 to remove any ac components therein above 160 Hz (above one half the comb filter drive frequency) and then through a 10 Hz notch filter 330 to attenuate any 10 Hz component due to improper centering of the lens 28 or prism power of the lens 28 which has not been completely compensated for by $x$ axis and $y$ axis translational adjustments of the refracted beam 22'. The output from the notch filter 330 should theoretically then be the 20 Hz cylinder ac component of the composite signal which also contains the cylinder axis information as its relative phase. Nevertheless, prior to phase detection, it is preferred to subject the output of notch filter 330 to additional band pass filtering centered about the desired 20 Hz component so as to insure the removal of possible spurious noise from the 20 Hz signal component.

For maximum noise rejection, a narrow band filter having a high Q is required. However, a major disadvantage of using a conventional narrow band high Q pass band filter is that there is a rather large rate of change of phase shift for frequencies falling on either side of the pass band center frequency. In the preferred embodiment, every effort is made to cause the cylinder signal to be at a predetermined frequency such as 20 Hz. Accordingly, the center of the narrow band high Q filter should also be at 20 Hz. However, if this 20 Hz signal should shift for some reason in frequency relative to the center frequency of the filter 332, then the output of the filter 332 would not only decrease in amplitude but, more importantly, a relatively large undesired change in the phase of the output of filter 332 would occur, thus introducing error into the subsequent measurement of cylinder axis which is based upon the phase of the output of band pass filter 332. Component aging in the electrical components of the filter itself, undesired changes in the motor speed which drives the scanner 24 and photo-detector 36, etc. can easily result in slight misalignments of the center frequency of the band pass filter 332 (if a conventional band pass filter is used) and the actual frequency of the cylindrical ac component of the composite signal at 214.

Accordingly, the preferred embodiment of this invention utilized techniques for reducing such phase variations. First of all, the motor drive control 202 comprises a precision phase lock loop to hold motor speed within ±0.25%. The second technique utilized for reducing phase variations is to use a narrow band high Q tracking filter having a center pass band frequency which is actually determined by a synchronization signal generated by the motor drive 202.

Figure 8A:
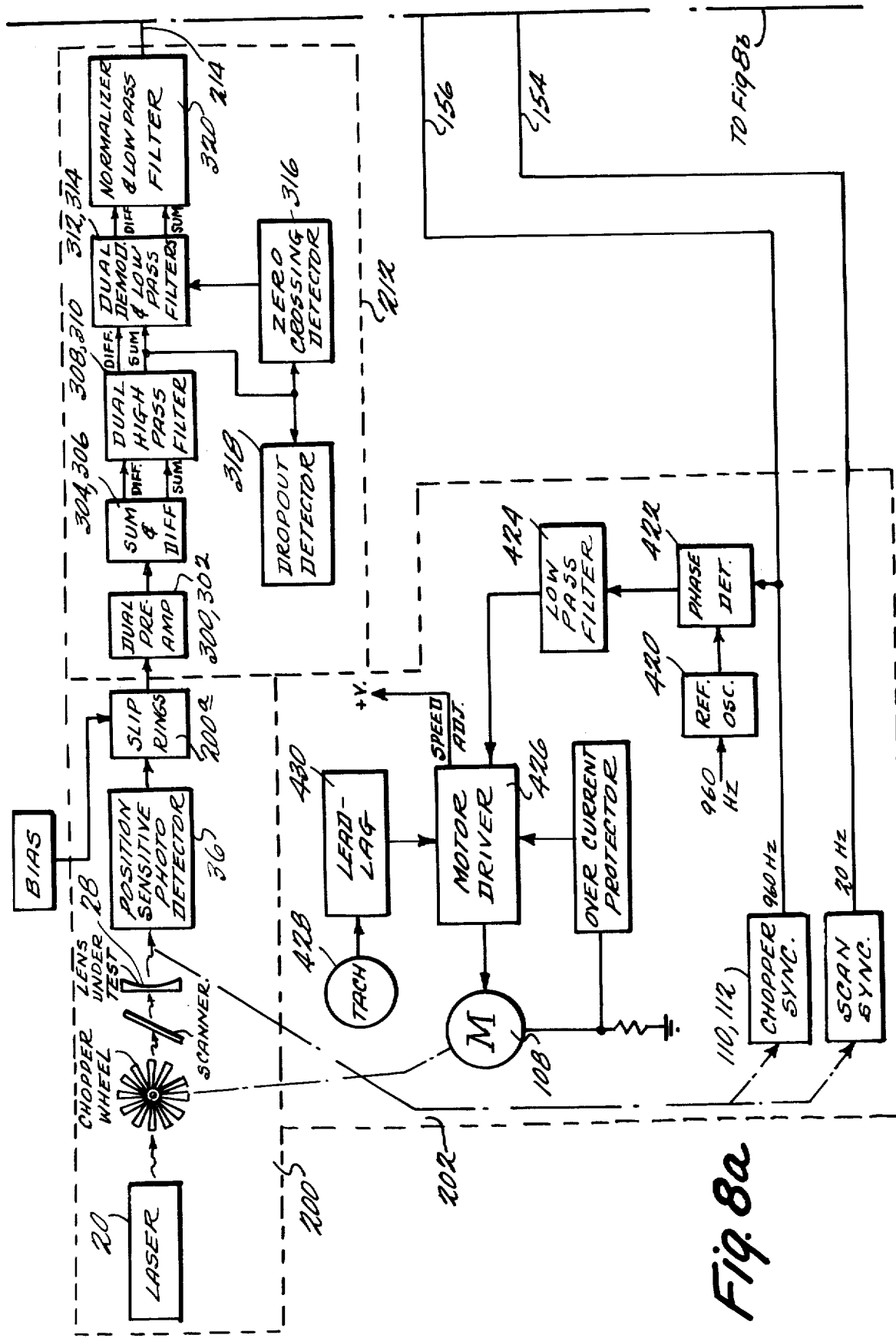
FIGS. 8a – 8c are a still more detailed functional block diagram for the preferred exemplary embodiment of FIG. 5.

As shown in FIG. 8a, an ac motor 108 is employed. However, as those in the art will appreciate, there are also techniques for controlling the speed of an dc motor. As shown in FIG. 8, a reference oscillator 420 oscillates at 960 Hz. At the same time, the chopper synchronization signal generator comprising components 110, 112 (see FIG. 5) generates an output which will also be 960 Hz provided that the motor 108 is turning at its proper rate of rotation. The phase of the reference oscillator output and the chopper sync signal are compared at 422. Whenever these signals are of the same frequency and a predetermined constant phase relationship, the output of the phase detector 422 and of the subsequent low pass filter 424 will be zero volts and the motor driver 426 will be supplying the proper voltage and frequency to motor 108 to result in a 960 Hz chopper sync signal. Should the motor speed vary from this desired rate of rotation, the output of the phase detector 422 and low pass filter 424 will vary in the proper direction to cause the output from the motor driver 426 to correctly control the motor speed so as to maintain the 960 Hz chopper sync output. The tachometer 428 and lead-lag network 430 may be used to minimize the effect of varying motor constants and load conditions on the phase locked loop just described, as will be appreciated.

The tracking band pass filter 322 will be described in more detail in connection with FIG. 10c. However, in brief, the exemplary tracking filter comprises 16 capacitors connected to a 16 pole commutating switch (actually a solid state device) driven by a 320 Hz (16 poles times 20 Hz desired center frequency) signal derived by dividing the chopper sync 960 Hz signal by three at divider 334. Each capacitor is thus connected sequentially between the band pass filter input and ground for 1/320 second. The output of the commutating filter is a 20 Hz sine was having steps at the 320 Hz switching rate. Accordingly, a second 30 Hz low pass filter 336 is utilized for removing the 320 Hz steps.

It is noted that this particular type of commutating filter is known per se in the art and that when this particular type of tracking band pass filter is utilized, it is particularly advantageous to precede it with a low pass filter 328 and notch filter 300 to block any strong 10 Hz component or components above 160 Hz that may be present since such components could, upon entering the input of band pass filter 332, causing aliasing or erroneous outputs. Particularly strong out of frequency components can also overload the commutating filter. Furthermore, those in the art will appreciate that other types of tracking band pass filter structures can also be utilized.

The zero crossings of the nominally 20 Hz output of low pass filter 336 are detected in zero crossing detector 338 and utilized for clocking demodulator switches in demodulator 340. The phase of the clock with respect to demodulator 340 may be selected by mode switch 342 to result in either positive or negative output on the cylinder power measurement channel 216. At the same time, this will also cause one-half the cylinder power signal to be added or subtracted respectively at 326 in the spherical power channel 228. The demodulator 340 then removes the 20 Hz modulation from the cylinder component of the composite signal. Any significant residual cyclic modulation is removed by the 1 Hz low pass filter 334 before resulting in a cylinder power signal representing the cylinder power of the lens 28 under test.

The output of the zero crossing detector 338 is also input to the axis phase detector 346 as is the scan synchronization signal on line 154 which also occurs at 20 Hz. In the preferred embodiment, a special form of phase detector 346 is employed as will be explained in more detail with respect to FIG. 10d. The output from the axis phase detector is then passed through the 1 Hz low pass filter 348 to provide the analog cylinder axis output.

Figure 8B:
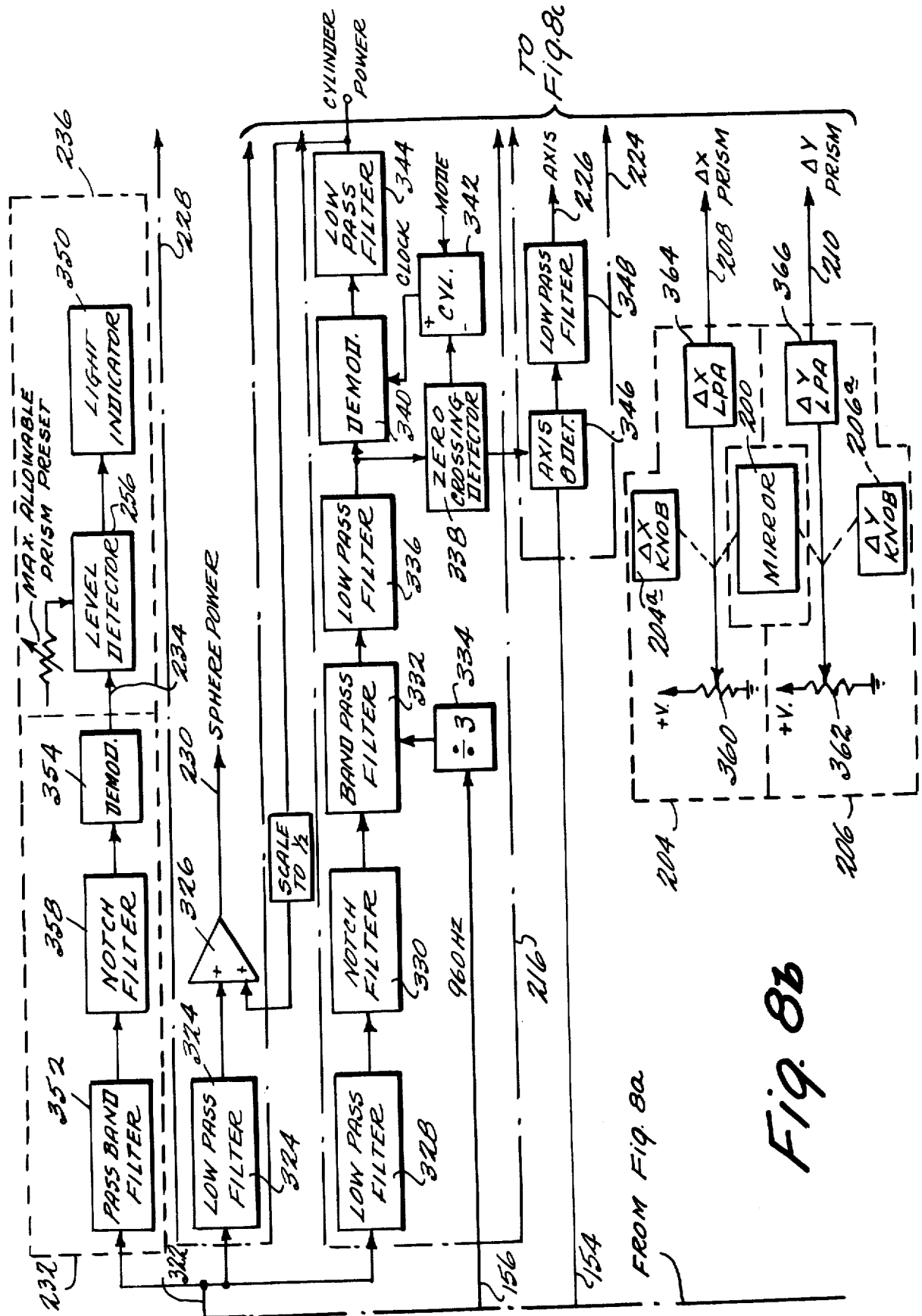

As previously explained, control means 204, 206 are used to move a mirror 200 so as to properly position the refracted light beam 22' coming from the lens under test 28 such that the prism signal at 10 Hz is minimized. As shown in FIG. 8b, the minimizing of the 10 Hz component might be shown by a light indicator 350 driven by 10 Hz pass band filter 352 driving a synchronous 10 Hz demodulator 354 whose output, in turn, may drive a level detector 356 which controls the light indicator 350 in response to the output of the demodulator 354 either falling below or rising above some predetermined level. In addition, if desired, it may also be advantageous to include the 20 Hz notch filter 358 in the prism channel 232. The notch filter is shown in FIG. 8b as succeeding the pass band filter 352. However, it may be desired to place the notch filter 358 prior to the pass band filter 352 as in the cylinder power channel 316 already discussed.

When the control knobs 204a, 206a are thus properly positioned to minimize the 10 Hz prism components of the composite signal at 214, the positions of these control knobs may be electrically encoded by potentiometers 360, 362 whose electrical output is proportional to the magnitude of adjustment effected by the control knobs 204a, 206a. The output of potentiometers 360, 362 may be scaled by amplification as at 364, 366 before providing the $x$ axis and $y$ axis output analog prism power signals.

Figure 8C:
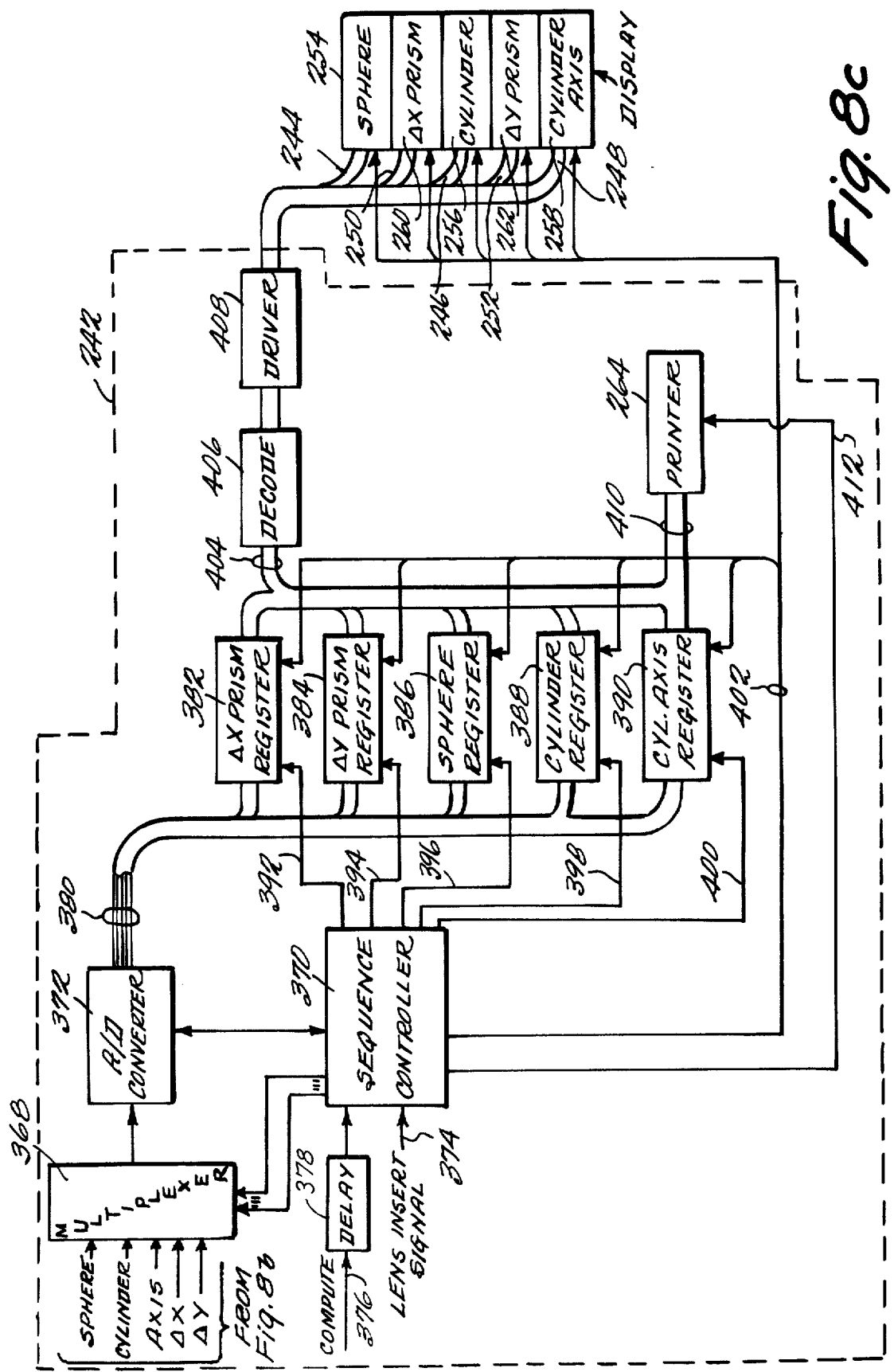

The five analog signals representing sphere power, cylinder power, cylinder axis, $x$ axis prism power and $y$ axis prism power as shown to the right hand side of FIG. 8b are connected in the preferred exemplary embodiment as shown at the left hand side of FIG. 8c, to a digitally controlled analog multiplexer 368 which is sequentially enabled via sequence controller 370 to individually select one of the five inputs and route it to an analog/digital converter 372. The sequence controller 370 initiates its action once it has an input signal at 374 indicating that a lens 28 has indeed been inserted and upon also being commanded to "compute" by a manual or automatic input 376 which is nominally delayed for two seconds at 378 before being input to the sequence controller 370. Of course, the sequence controller may also be controlled by the drop-out detector 318. The lens insertion signal at 374 may be generated by a microswitch or other conventional electrical transducer sensing the physical presence of the lens in the lens holder 122.

Once the sequence control is activated to select a particular one of the five analog inputs through the multiplexer 368, the corresponding digital data will appear at the output of analog/digital converter 372 on lines 380 and be entered to the input of a selected one of the five digital data registers 382, 384, 386, 388 and 390. At the same time, the sequence controller will issue a select and load enabling signal on a corresponding one of control lines 392, 394, 396, 398 and 400 so that the digital data on lines 380 is stored in its respectively corresponding digital data register. Subsequently, a select and display enabling signal is presented to a selected one or all of the data storage registers via control lines 402 to enable the contents of the digital data storage register(s) to be passed via output lines 404 through a decoder 406 and driver 408, if necessary, to drive visual digital displays 254, 256, 258, 260 and 262. Also, the same digital data may be passed via output lines 410 to a printer mechanism 264 controlled by line 412 by the sequence controller 370.

Exemplary timing diagrams for the loading and display of the five refractive parameters by the sequence controller are shown in FIG. 9.

The decoder 406 is utilized for converting the stored binary information from the digital data storage registers to the required display format, usually 7-segment display characters. The digital visual displays 254-262 then present the measured values of sphere power, cylinder power, cylinder axis and prism carthesian coordinates to the operator of the apparatus approximately 2 seconds or less after the lens is inserted and a "compute" instruction is issued to the apparatus by the operator.

Figure 10A:
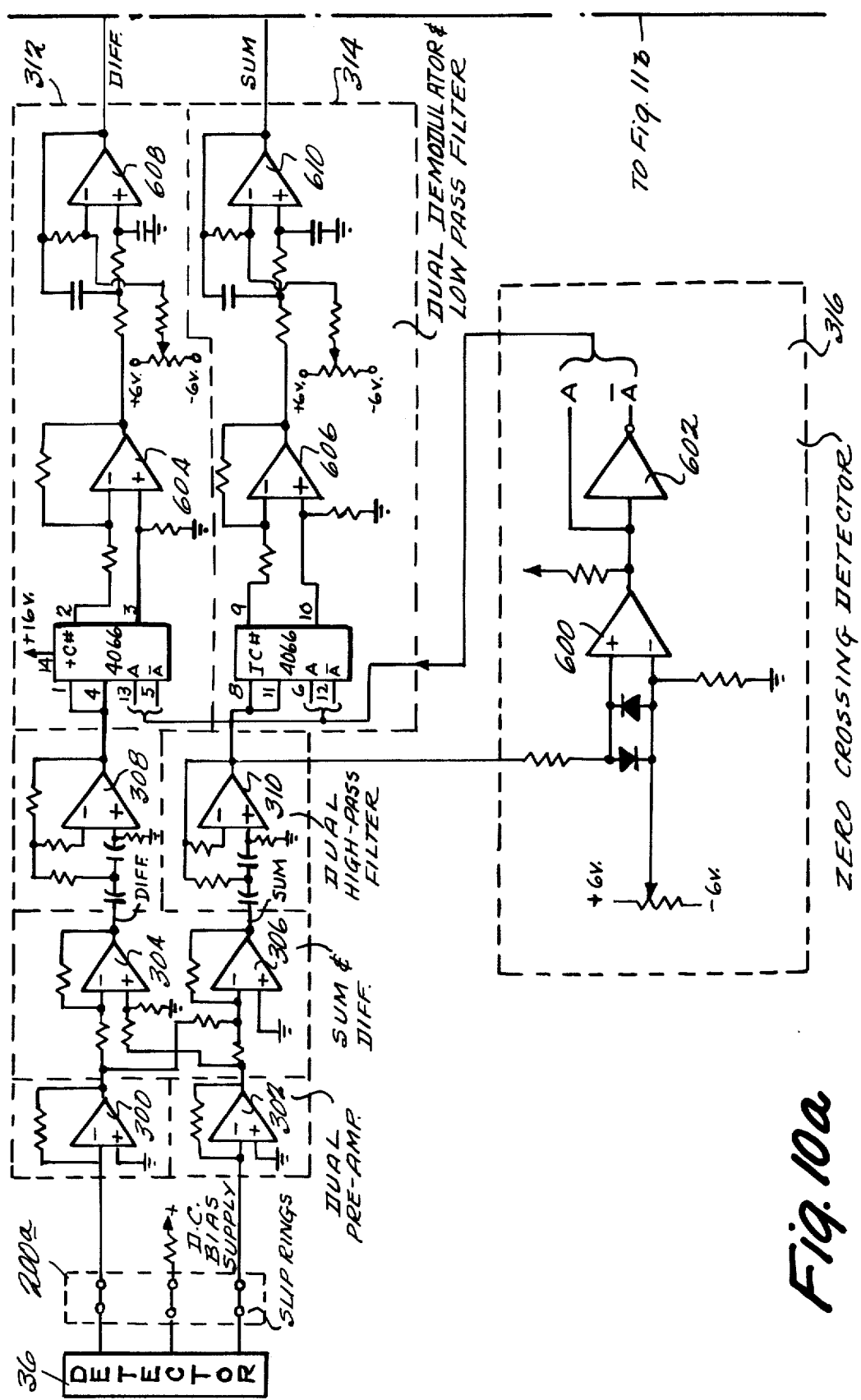
Figure 10C:
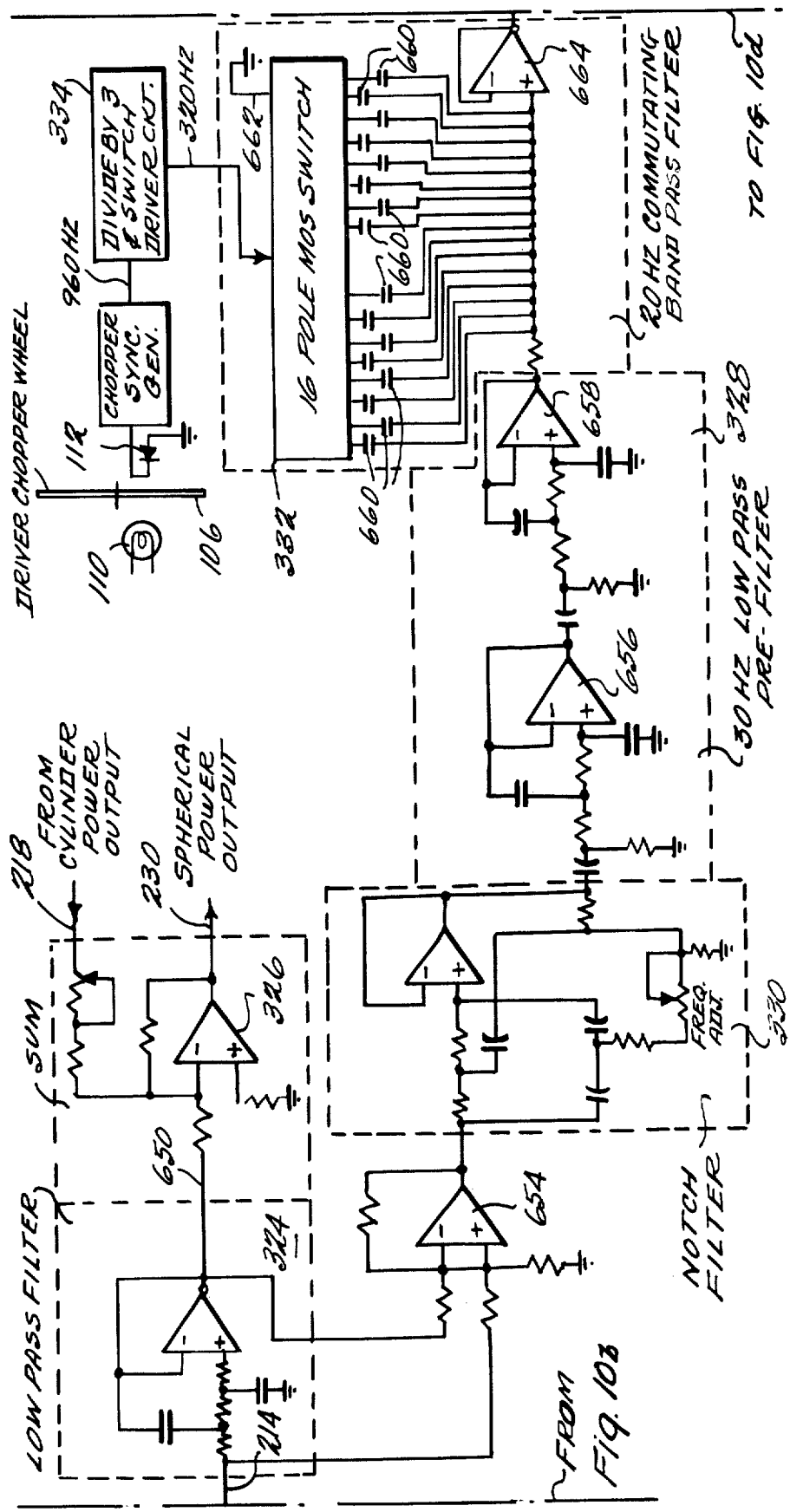

Reference is now made to FIGS. 10a-10d. As shown, the detector 36 has three leads which are connected through slip rings 200a to the electrical processing circuitry. One of those leads is a bias supply while the other two leads are signal outputs from the detector which are individually amplified in dual preamplifiers 300, 302 before being subtracted and added respectively in amplifiers 304 and 306 to provide difference and sum signals respectively as shown in FIG. 10a. Amplifiers 308 and 310 are connected as shown to operate as dual channel high pass filters passing only frequencies above approximately 120 Hz in the exemplary embodiment, thus insuring that the 960 Hz modulated output of the detector acts as a carrier frequency for passing the encoded information relative to refractive properties of the lens under test through the high pass filters 308, 310.

As shown, the output of the high pass filter 310 of the sum channel is input to a zero crossing detector 316 comprising an amplifier 600 which is rapidly saturated in either direction as the sum channel signal passes through zero. The output of amplifier 600 is thus a square wave occurring at 960 Hz in synchronism with the 960 Hz modulation on the photo-detector output. This zero crossing 960 Hz output is inverted at 602 so as to provide both a non-inverted A and inverted A clocking output for use in synchronously switching the 960 Hz signals in the difference and sum channels to the summing and differencing terminals of amplifiers 604, 606 respectively. Solid state switches (e.g. integrated circuit type 4066 comprises four such switches) are used for controllably switching the individual sum and difference channels between the positive and negative inputs of amplifiers 604 and 606 so as to produce a unidirectional signal at the output of amplifiers 604 and 606 respectively, as will be appreciated. Amplifiers 608 and 610 in the difference and sum channels respectively are connected as shown in FIG. 10a to operate as low pass filters to remove any 960 Hz residual that may be left in the output of amplifiers 604 and 606.

The normalizer 320 takes the difference channel output and controllably switches it through solid state switch 612 to the input of a low pass amplifier 614 at a 5 KHz rate for time periods that are inversely proportional to the magnitude of the signal appearing on the sum channel. This is accomplished by a dual slope integrating pulse width modulator technique which should be known per se to those in the art. Briefly, a 5 KHz reference oscillator 616 drives a counter 618 which effectively divides the output by 10. Counter 618 is arranged to provide two complementary outputs on line 620 and 622. The output on line 620 occurs at the 5 KHz reference rate and has individual pulse duration of one-tenth the interval between pulses. The output on line 622 is "on" for the remaining 9/10th of the 5 KHz repetition rate interval. Accordingly, a minus six volt reference voltage is gated for a predetermined fixed one/tenth period through switch 624 to the input of integrating amplifier 626 whose output therefore increases accordingly to a predetermined magnitude. Thereafter, switch 624 is disabled while switch 628 is enabled for the remaining 9/10th of the interval, thus reversing the polarity of input to the integrator 626 and causing it to ramp in the opposite direction toward zero. When the zero level is actually attained, amplifier 630 will rapidly saturate in a reverse direction and thus causing a reversal of the output from inverter 632 which will, in turn, toggle flip-flop 634 and reset flip-flop 636 which had earlier been toggled to its set state by the output on line 622. The Q output from flip-flop 634 through control switch 638 will reset the integrating amplifier 626. The flip-flop 636, when reset, will disable switch 612 and enable switch 640 thus connecting the input of low pass amplifier 614 to ground.

Since the flip-flop 636 was initially set by the appearance of the output on line 622, at the beginning of the signal integration period, it may be seen that gate 612 is enabled to pass the difference channel signal to the input of low pass amplifier 614 only during the time period for which the integrator 626 is integrating the sum channel signal down from a reference level toward zero. Accordingly, if the signal on the sum channel at 314 is relatively large in magnitude, it will take a relatively short time for the integrator 626 to reach zero level and therefore gate 612 will be enabled for a relatively short period of time. On the other hand, if the magnitude of the sum channel signal 314 is relatively low, then integrator 626 will be integrating downwardly from its reference point for a relatively longer period of time thus keeping gate 612 enabled for a relatively longer period of time. The result is that the difference channel signal is gated to low pass amplifier 614 at a 5 KHz rate with the pulse duration of such gating being inversely proportional to the magnitude of the sum channel signal. Thus, the average signal level appearing at the output of switch 612 will effectively be the difference signal divided by the sum signal. The 5 KHz modulation is removed by the low pass filter 614 to result in a composite output signal on line 214 corresponding to that described with respect to FIG. 4 of this application.

As shown, the low pass filter 324 comprises an amplifier connected to act as a low pass filter while the sum amplifier 326 in the spherical power channl is connected so as to sum the average spherical power signal on line 650 with one-half of the cylinder power output signal on line 218 by properly choosing the resistance values connected to the summing node at the input of amplifier 326. As has been explained, the cylinder power output on line 218 may be of either polarity depending upon the selection at a cylinder mode control 342, thus causing the output of amplifier 326 to represent either maximum or minimum spherical power of the lens under test depending upon the condition of the cylinder mode control 342.

The composite output 214 is also connected through amplifier 654 to the input of the notch filter 330 which has its electrical parameters chosen so as to effectively stop or severely attenuate 10 Hz components of the composite signal. In addition, the low pass filter 328 is shown as comprising two amplifiers 656, 658 connected to act as low pass filters with electrical parameters chosen so as to begin attenuating signals above 30 Hz and severely attenuate above 160 Hz.

The 20 Hz commutating band pass filter 332 is shown as comprising 16 identical capacitors 660 which are connected to a 16 pole MOS switch (two integrated circuits of the type 14529 may be utilized) which sequentially and repetitively connect the individual 16 capacitors 660 to a ground connection 662. The 16 pole MOS switch is driven by the 960 Hz output of the chopper sync generator through divider 334 which produces the required 320 Hz driving signal for the 16 pole MOS switch. The output of the commutating band pass filter 332 is taken from an amplifier 664 and passed through the following 30 Hz low pass filter 336 so as to remove the 320 Hz switching steps from the output of the commutating band pass filter. The nominal 20 Hz output from filter 336 is changed to a unidirectional signal by demodulator 340 which synchronously switches the 20 Hz signal through switches 666 and 668 to the plus or minus inputs of amplifier 670 as appropriate to produce a unidirectional output therefrom. The synchronous control signals for switches 666 and 668 are derived by zero crossing detector 338 from the nominally 20 Hz output of filter 336.

The output of amplifier 672 rapidly saturates in either direction as the input thereto crosses through a zero level thus driving inverters 674, 676 between their opposite extreme saturated outputs. The output of inverter 676 is passed through exclusive OR gate 678 to control switch 666 while the output of inverter 674 (complementary to the output of inverter 676) is passed through exclusive OR gate 680 to control switch 668. As will be appreciated, the output of exclusive OR gates 678, 680 may be inverted from the input thereto depending upon the value of other inputs to these OR gates. As shown, a cylinder mode control 342 comprises OR gates 678 and 680 in combination with switch 682 which may selectively provide either positive or negative auxiliary inputs to the exclusive OR gates.

Thus, as should now be appreciated, when switch 682 applies a positive auxiliary input to OR gates 678 and 680, the output of the demodulator 340 from amplifier 670 will be of a first unidirectional polarity. If switch 682 is in its opposite position, a negative auxiliary input will be provided to exclusive OR gate 678, 680, thus causing the output of the modulator 340 to be of the opposite unidirectional polarity. As previously explained, the output from the modulator 340 is then passed through one very low pass filter 344 to provide the ± cylinder power output signal on line 218. It is this signal which may be of either polarity depending upon the position of switch 682 and which is then scaled by one-half and added at the input summation node of sum amplifier 326 in the spherical power channel to provide maximum or minimum spherical power output respectively.

The output of the zero crossing detector 338 is also fed via line 684 to the axis phase detector 346. In addition, the scan sync generator is shown as generating a 20 Hz reference signal which is passed to a zero crossing detector comprising saturating amplifier 686 and inverters 688 and 690. This reference 20 Hz synchronization signal is provided on line 154 then to the other input of axis phase detector 346.

The axis phase detector 346 in the preferred exemplary embodiment comprises four cross coupled JK flip-flops which monitor the respectively corresponding edges of the wave forms output from the zero crossing detector 338 and scan synchronization signal on line 154.

Figure 10D:
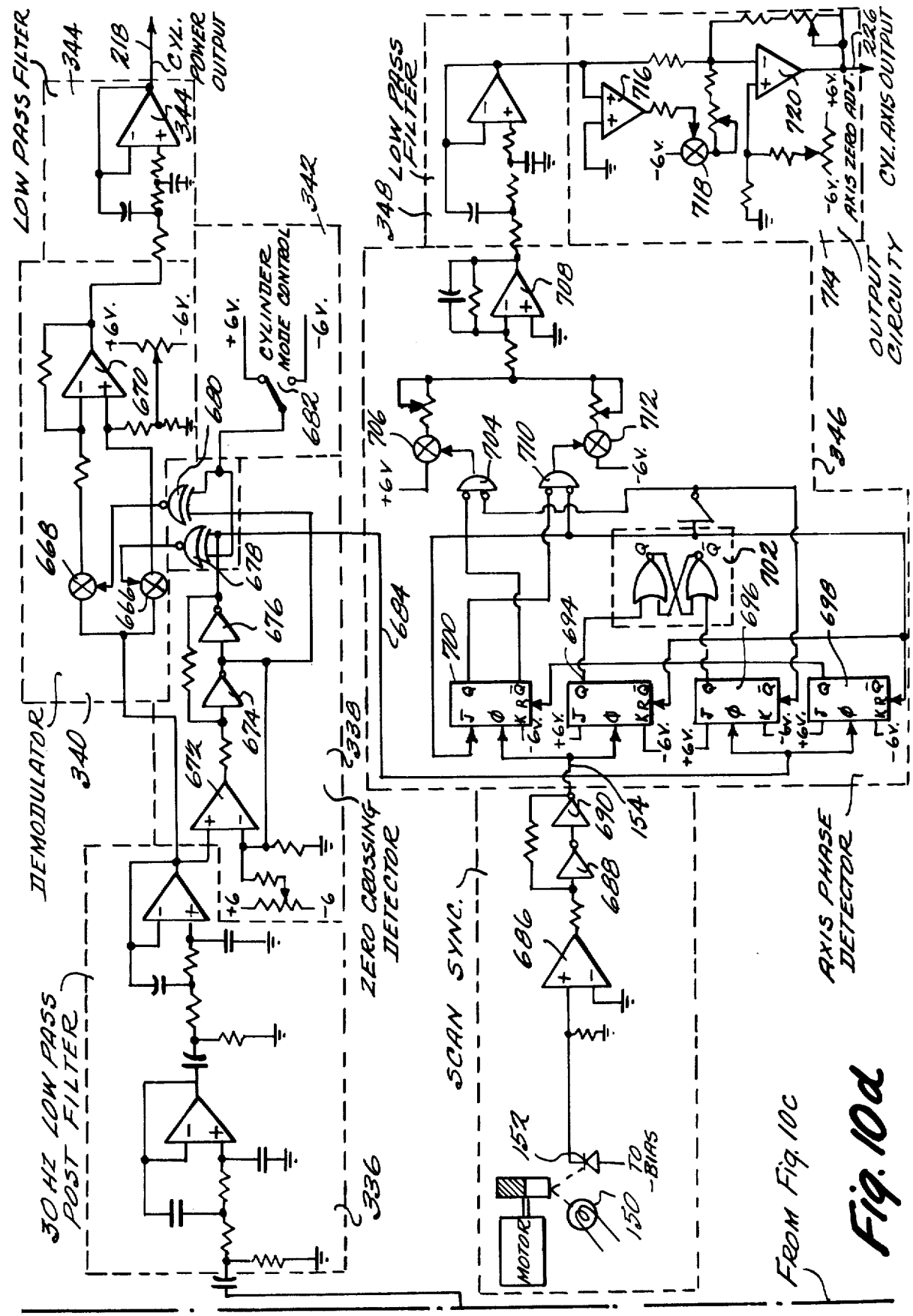

As shown in FIG. 10d, the JK flip-flops 694, 696 and 698 have their JK inputs constantly connected to positive and negative supplies, respectively, so that they are constantly enabled to transition upon receiving the proper input to the φ input thereto. At the same time, JK flip-flop 700 has its J input connected to the Q output of an RS flip-flop 702.

In the case where the reference synchronization signal on line 154 leads the 20 Hz axis signal on line 684, JK flip-flop 694 will be transitioned to result in setting RS flip-flop 702 by the first controlling leading edge of the signal on line 154. Subsequently, the lagging leading edge of the signal on line 684 will occur transitioning JK flip-flops 696 and 698 which will reset RS flip-flop 702, thus preventing JK 700 from transitioning. The result is that JK flip-flop 700 will remain with its Q output continuously low and its Q output continuously high while the Q output from the RS flip-flop 702 will periodically go high at a 20 Hz rate with the period of each such pulse being proportional to the phase lag of the axis signal on line 684. This will result in NAND gate 704 correspondingly controlling the electronic switch 706 to gate a positive reference voltage to the input of amplifier 708 for a time period during each input cycle corresponding to the amount of phase lag of the 20 Hz axis signal on line 684 with respect to the reference synchronization signal on line 154.

Now assume the opposite case where the phase of the axis signal on line 684 leads the phase of the synchronization signal on line 154. In this case, the first controlling leading edge on line 684 will transition JK flip-flops 696, 698 to reset RS flip-flop 702, thus causing a low logic signal to appear on the J input of flip-flop 700 preventing it from transitioning when the next subsequent controlling leading edge on line 154 occurs. At the same time, the subsequent or lagging controlling leading edge on line 154 will transition JK flip-flop 694, thus setting RS flip-flop 702 in readiness for the next cycle. However, JK flip-flop 700 will remain in its reset condition with a high Q and low Q output. Again, the Q output of RS flip-flop 702 will transition at the nominal 20 Hz rate and the period of each such transition will be proportional to the phase lead of the axis signal on line 684 with respect to the synchronization signal on line 154. In this case, NAND gate 710 will be correspondingly enabled to control gate 712 which then gates a negative reference voltage to the input of amplifier 708 at the nominal 20 Hz rate for time periods proportional to the phase lead of the axis signal. Accordingly, as may be appreciated now, the output of amplifier 708 will have a dc or average component which is positive for axis phase lead condition and negative for an axis phase lagging condition and the magnitude of the signal will be proportional to the amount of phase lead or lag as the case may be. This signal is then passed through a low pass filter 348 to extract the average or dc component therefrom.

It should be noted that the digital phase detector 346 just described also provides a proper output even when the phases of the input signals on lines 684 and 154 are exactly coincident. In this case, both switches 706 and 712 will be simultaneously enabled for the briefest switching transient period. In any event, since the output of switches 706 and 712 is added and of opposite polarity, even such brief simultaneous switching transients should produce substantially zero output from amplifier 708.

As will be appreciated by those in the art, there is a possible 180° ambiguity in defining the cylinder axis. In other words, a plus 135° axis might be thought of as equivalent to a minus 45° axis. However, by convention, only positive axis indications are actually utilized and, accordingly, it is desirable that the final cylinder axis output signal be of a unidirectional polarity. Accordingly, output circuitry 714 is provided including a zero level detecting amplifier 716 which controls a switch 718. Accordingly, whenever the output from the low pass filter 348 goes positive, the output from amplifier 716 will control switch 718 to add a negative predetermined reference level to the input of a final output amplifier 720, thus insuring that the output of amplifier 720 always maintains a unidirectional polarity. In addition, the final output amplifier may include zero adjustments, gain adjustments, etc. as shown.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Apparatus for measuring refractive properties of a sphero-cylindrical optical system under test including the measurement of at least one of the spherical power, cylindrical power and cylindrical axis refractive properties which are potentially present in a sphero-cylindrical optical system, said apparatus including: light source means for providing a beam of incident light rays emanating along the general direction of a predetermined line axis, means for positioning said optical system under test in the path of said beam of incident light rays, relative movement means for effecting relative rotational motion at a predetermined rotative frequency $f_1$ between said beam of incident light rays and said optical system under test so as to cause the beam to effectively move about a predefined first locus in the plane of said optical system under test and thereby produce a refracted light beam which moves correspondingly about a second locus in a subsequent plane parallel to the plane of the optical system, said second locus having relative maximum and minimum dimensions representative of the spherical power, cylindrical power, and cylinder axis refractive parameters, photo detector means having a photoelectric position sensitive surface disposed in the path of said refracted light beam for producing an analog electrical output having an instantaneous magnitude representative of the relative instantaneous position on said position sensitive surface at which the refracted light beam strikes the photosensitive surface, said analog electrical output comprising a composite analog signal having a plurality of predetermined analog signal characteristics, each respectively representative of one of said refractive properties, and electrical processing circuit means connected to receive said electrical output and including means selectively responsive to different ones of said predetermined analog signal characteristics so as to provide an output indication representing said at least one refractive property of the optical system under test.

2. Apparatus as in claim 1 wherein said electrical processing circuit means includes means for synchronously processing said electrical output from the photo detector means with respect to the relative motion being effected by said relative movement means.

3. Apparatus as in claim 1 wherein said photo detector means includes means for synchronously moving said photoelectric sensitive surface with respect to the relative motion being effected by said relative movement means.

4. Apparatus as in claim 3 wherein said electrical processing circuit means includes means for synchronously processing said electrical output from the photo detector means with respect to the relative motion being effected by said relative movement means.

5. Apparatus as in claim 1 including means for causing said incident light beam to always converge toward a common point on said photoelectric sensitive surface in the absence of said optcal system under test from the light beam path.

6. Apparatus as in claim 1 wherein said means for positioning includes:
   $x$-axis adjustment means for effecting $x$-axis adjustment of the relative positioning between said light beam and said photo detector means along an $x$-axis dimension to compensate for any $x$-axis prism refractive properties of said optical system under test.
   $y$-axis adjustment means for effecting $y$-axis adjustment of the relative positioning between said light beam and said photo detector means along a $y$-axis dimension orthogonal to said $x$-axis dimension to compensate for any $y$-axis prism refractive properties of said optical system under test, and
   prism power encoding means operatively connected to said $x$-axis adjustment means and said $y$-axis adjustment means for sensing the magnitude of such $x$-axis and $y$-axis position adjustments and for providing a corresponding $x$-axis prism output signal and a $y$-axis prism output signal representative of the prism power of the optical system under test along said $x$-axis and $y$-axis dimensions respectively.

7. Apparatus as in claim 1 wherein said relative movement means includes means for causing said beam of incident light rays to pass around the locus of a circle in said first plane at a predetermined rotational rate of $f_1$ revolutions per second, and wherein said electrical processing circuit means includes:
   means for providing a composite electrical signal from said electrical output of the photodetector means, said composite signal having a d.c. or average component representative of the average spherical power of said optical system under test and a first a.c. component at $2f_1$ Hz with a magnitude representing the cylindrical power of said optical system under test, the phase of said first a.c. component with respect to the predetermined relative motion representing the cylindrical axis of said optical system under test,
   synchronization means operatively associated with said relative movement means for providing an electrical synchronization signal having cyclic synchronism with the predetermined relative motion,
   first processing means connected to provide a spherical output signal representative of at least said d.c. component and thus representative of the average spherical power of said optical system under test,
   second processing means connected to provide a cylinder output signal representative of the magnitude of said first a.c. component and thus representative of the cylindrical power of said optical system under test, and
   third processing means connected to compare the phase of said first a.c. component with the phase of said synchronization signal to provide an axis output signal representative of the phase difference therebetween and thus representative of the relative cylindrical axis orientation of said optical system under test.

8. Apparatus as in claim 7 wherein said electrical processing circuit means includes means for selectively effectively adding or subtracting substantially one-half of said cylinder output signal to provide a final spherical output signal representative of the maximum or minimum spherical power respectively of the optical system under test.

9. Apparatus as in claim 7 wherein:
   said means for providing a composite electrical signal also provides a second a.c. component thereof at $f_1$ Hz having a magnitude representing the prism power of said optical system under test with respect to its effective relative optical position with respect to a predetermined point on said photo detector means and
   said electrical processing circuit means includes fourth processing means connected to provide a prism output signal representative of the magnitude of said second a.c. component and thus representative of the prism power of said optical system under test with respect to its existing effective relative positioning.

10. Apparatus as in claim 7 wherein:
    said light source means includes means for amplitude modulating said beam of incident light rays at a predetermined frequency $f_2$ Hz where $f_2$ is higher than $4f_1$ Hz, and
    said means for providing a composite electrical signal includes demodulating means for substantially removing the $f_2$ Hz component of amplitude modulation from the electrical output of the photo detector means.

11. Apparatus as in claim 7 wherein said means for providing a composite electrical signal includes normalization means for controlling the magnitude of said composite electrical signal by making it inversely proportional to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test.

12. Apparatus as in claim 7 wherein at least one of said second and third processing means includes:
    a tracking bandpass frequency filter means having a bandpass frequency which is automatically adjusted to substantially coincide with the $2f_1$ frequency of the first a.c. component in spite of possible deviations therein such as may be caused by corresponding deviations of the speed of said relative movement means and changes in electrical circuit parameters thereby minimizing phase changes which would otherwise be introduced in the first a.c. component before it is separated from the composite signal and its phase is compared with said synchronization signal.

13. Apparatus as in claim 7 further comprising analog to digital connector means and digital display means connected to receive at least one of said spherical output signal, said cylindrical output signal and said axis output signal and to provide a humanly sensible digital output indication corresponding thereto.

14. Apparatus for measuring refractive properties of a sphero-cylindrical optical system under test including the measurement of at least one of the spherical power, cylindrical power and cylindrical axis refractive properties which are potentially present in a sphero-cylindrical optical system, said apparatus including:

light source means for providing a beam of incident light rays emanating along the general direction of a predetermined line axis at a plurality of circumferentially spaced successive beam positions around said line axis and radially spaced substantially equidistant from said line axis at any given point therealong and effectively rotating through said successive beam positions at a predetermined rotational frequency $f_1$, means for positioning said optical system under test in the path of said incident light beams thereby producing respectively corresponding refracted light beams emanating from said optical system under test, photo detector means having a photoelectric sensitive surface disposed in the path of said refracted light beams for producing an analog electrical output having an instantaneous magnitude representative of the relative instantaneous positions on said position sensitive surface at which the refracted light beams strike the photosensitive surface, said analog electrical output comprising a composite analog signal having a plurality of predetermined analog signal characteristics, each respectively representative of one of said refractive properties, and electrical processing circuit means connected to receive said electrical output and including means selectively responsive to different ones of said predetermined analog signal characteristics so as to provide an output indication representing said at least one refractive property of the optical system under test.

15. Apparatus as in claim 14 wherein said light source means includes means causing said light rays along said plurality of beam positions to converge toward a common point on said photoelectric sensitive surface in the absence of said optical system under test from the light beam paths.

16. Apparatus as in claim 14 wherein said light source means includes:

a light beam source providing a first light beam generally coincident with said predetermined line axis, and beam scanning means disposed in the path of said first light beam for deflecting said first light beam along a beam path generally radially displaced from said predetermined axis and for rotating the thusly deflected light beam through said plurality of successive beam positions.

17. Apparatus as in claim 16 wherein said beam scanning means comprises:

a refractive member having first and second planar surfaces disposed at a predetermined angle with respect to said line axis, and drive means for rotating said refractive member about said line axis at a predetermined rate of rotation.

18. Apparatus as in claim 17 wherein:

said first and second planar surfaces are inclined with respect to one another sufficiently to cause said deflected light beam to converge toward a common point on said photoelectric sensitive surface in the absence of said optical system under test for all rotational positions of said refractive member.

19. Apparatus as in claim 14 wherein said means for positioning includes:

x-axis adjustment means for effecting x-axis adjustment of the relative positioning between said refracted light beams and said photo detector means along an x-axis dimension to compensate for any x-axis prism refractive properties of said optical system under test, y-axis adjustment means for effecting y-axis adjustment of the relative positioning between said refracted light beams and said photo detector means along a y-axis dimension orthogonal to said x-axis dimension to compensate for any y-axis prism refractive properties of said optical system under test, and prism power encoding means operatively connected to said x-axis adjustment means and said y-axis adjustment means for sensing the magnitude of such x-axis and y-axis position adjustments and for providing a corresponding x-axis prism output signal and a y-axis prism output signal representative of the prism power of the optical system under test along said x-axis and y-axis dimensions respectively.

20. Apparatus as in claim 19 wherein said means for positioning comprises a mirror surface disposed in the path of said refracted light beams and mounted for rotational movement along two orthogonal axes aligned with said x-axis and y-axis dimensions, and said x-axis adjustment means and said y-axis adjustment means comprises means for independently rotating said mirror surface about its respectively associated orthogonal axes.

21. Apparatus as in claim 14 wherein said light source means includes rotation means for causing said beam of incident rays to pass through said successive beam positions about said line axis at a predetermined rotational rate of $f_1$ revolutions per second, and wherein said electrical processing circuit means includes:

means for providing a composite electrical signal from said electical output of the photo detector means, said composite signal having a d.c. or average component representative of the average spherical power of said optical system under test and a first a.c. component at $2f_1$ Hz with a magnitude representing the cylindrical power of said optical system under test, the phase of said first a.c. component with respect to the predetermined rotational movement of said successive beam positions representing the cylindrical axis of said optical system under test, synchronization means operatively associated with said rotation means for providing an electrical synchronization signal having cyclic synchronism with the predetermined rotational passage of said successive beam positions, first processing means connected to provide a spherical output signal representative of at least said d.c. component and thus representative of the average spherical power of said optical system under test, second processing means connected to provide a cylinder output signal representative of the magnitude of said first a.c. component and thus representative of the cylindrical power of said optical system under test, and third processing means connected to compare the phase of said first a.c. component with the phase of said synchronization signal to provide an axis output signal representative of the phase difference therebetween and thus representative of the relative cylindrical axis orientation of said optical system under test.

22. Apparatus as in claim 21 wherein said electrical processing circuit means further includes means for effectively adding substantially one-half of said cylinder output signal to said spherical output signal to provide a final spherical output signal representative of the maximum spherical power of said optical system under test.

23. Apparatus as in claim 21 wherein said electrical processing circuit means further includes means for effectively subtracting substantially one-half of said cylinder output signal to provide a final spherical output signal representative of the minimum spherical power of said optical system under test.

24. Apparatus as in claim 21 wherein said electrical processing circuit means includes means for selectively effectively adding or subtracting substantially one-half of said cylinder output signal to provide a final spherical output signal representative of the maximum or minimum spherical power respectively of the optical system under test.

25. Apparatus as in claim 21 wherein:

said means for providing a composite electrical signal also provides a second a.c. component thereof at $f_1$ having a magnitude representing the prism power of said optical system under test with respect to its effective relative optical position with respect to a predetermined point on said photo detector means and said electrical processing circuit means includes fourth processing means connected to provide a prism output signal representative of the magnitude of said second a.c. component and thus representative of the prism power of said optical system under test with respect to said relative positioning.

26. Apparatus as in claim 21 wherein:

said light source means includes means for amplitude modulating said beam of incident light rays at a predetermined frequency $f_2$ Hz where $f_2$ is higher than $4f_1$ Hz, and said means for providing a composite electrical signal includes demodulating means for substantially removing the $f_2$ Hz component of amplitude modulation from the electrical output of the photo detector means.

27. Apparatus as in claim 21 wherein said means for providing a composite electrical signal includes normalization means for controlling the magnitude of said composite electrical signal by making it inversely proportional to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test that are to be measured.

28. Apparatus as in claim 21 wherein at least one of said second and third processing means includes:

a tracking bandpass frequency filter means having a bandpass frequency which is automatically adjusted to substantially coincide with the $2f_1$ frequency of the first a.c. component in spite of possible deviations therein such as may be caused by corresponding deviations of the speed of said rotation means and changes in electrical circuit parameters thereby minimizing phase changes which would otherwise be introduced in the first a.c. component before it is separated from the composite signal and its phase is compared with said synchronization signal.

29. Apparatus as in claim 21 further comprising analog to digital converter means and digital display means connected to receive at least one of said spherical output signal, said cylindrical output signal and said axis output signal and to provide a humanly sensible digital output indication corresponding thereto.

30. Apparatus as in claim 24 further comprising analog to digital converter means and digital display means connected to receive said spherical output signal, said cylindrical output signal and said axis output signal and to provide humanly sensible digital output indications respectively corresponding thereto.

31. Apparatus as in claim 21 wherein said means for positioning includes:

x-axis adjustment means for effecting x-axis adjustment of the relative positioning between said refracted light beams and said photo detector means along an x-axis dimension to compensate for any x-axis prism refractive properties of said optical system under test, y-axis adjustment means for effecting y-axis adjustment of the relative positioning between said refracted light beams and said photo detector means along a y-axis dimension orthogonal to said x-axis dimension to compensate for any y-axis prism refractive properties of said optical system under test, and prism power encoding means operatively connected to said x-axis adjustment means and said y-axis adjustment means for sensing the magnitude of such x-axis and y-axis position adjustments and for providing a corresponding x-axis prism output signal and a y-axis prism output signal representative of the prism power of the optical system under test along said x-axis and y-axis dimensions respectively.

32. Apparatus as in claim 31 wherein said electrical processing circuit means includes means for selectively effectively adding or subtracting substantially one-half of said cylinder output signal to provide a final spherical output signal representative of the maximum or minimum spherical power respectively of the optical system under test.

33. Apparatus as in claim 32 further comprising analog-to-digital converter means and digital display means connected to receive said spherical output signal, said cylindrical output signal, said axis output signal, said $x$-axis prism output signal and said $y$-axis prism output signal and to provide humanly sensible digital output indications respectively corresponding thereto.

34. Apparatus as in claim 33 wherein:
said means for providing a composite electrical signal also provides a second a.c. component thereof at $f_1$ Hz having a magnitude representing the prism power of said optical system under test with respect to its effective relative optical position with respect to a predetermined point on said photo detector means,
said electrical processing circuit means includes fourth processing means connected to provide a prism output signal representative of the magnitude of said second a.c. component and thus representative of the prism power of said optical system under test with respect to said relative positioning, and
level sensitive means connected to receive said prism output signal and to provide a humanly sensible output indication if said prism output signal exceeds a predetermined limit value thereby signaling the need to further adjust the $x$-axis and $y$-axis adjustment means before assuredly valid refractive property measurements can be provided by said apparatus.

35. Apparatus as in claim 33 wherein:
said light source means includes means for amplitude modulating said beam of incident light rays at a predetermined frequency $f_2$ Hz where $f_2$ is higher than $4f_1$ Hz, and
said means for providing a composite electrical signal includes demodulating means for substantially removing the $f_2$ Hz component of amplitude modulation from the electrical output of the photo detector means.

36. Apparatus as in claim 33 wherein said means for providing a composite electrical signal includes normalization means for controlling the magnitude of said composite electrical signal by making it inversely proportioned to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test that are to be measured.

37. Apparatus as in claim 33 wherein at least one of said second and third processing means includes:
a tracking bandpass frequency filter means having a bandpass frequency which is automatically adjusted to substantially coincide with the $2f_1$ frequency of the first a.c. component in spite of possible deviations therein such as may be caused by corresponding deviations of the speed of said rotation means and changes in electrical circuit parameters thereby minimizing phase changes which would otherwise be introduced in the first a.c. component before it is separated from the composite signal and its phase is compared with said synchronization signal.

38. Apparatus as in claim 37 wherein:
said light source means includes means for amplitude modulating said beam of incident light rays at a predetermined frequency $f_2$ Hz where $f_2$ is higher than $4f_1$ Hz, and
said means for providing a composite electrical signal includes demodulating means for substantially removing the $f_2$ Hz component of amplitude modulation from the electrical output of the photo detector means.

39. Apparatus as in claim 38 wherein said means for providing a composite electrical signal includes normalization means for controlling the magnitude of said composite electrical signal by making it inversely proportioned to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test that are to be measured.

40. Apparatus as in claim 39 further comprising inhibit means for inhibiting said humanly sensible digital output indications whenever the amplitude of the modulation frequency $f_2$ falls below a predetermined lower limit.

41. Apparatus as in claim 40 wherein said inhibit means also includes means for inhibiting said humanly sensible digital output indications whenever the optical system under test is removed from said apparatus.

42. Apparatus as in claim 21 wherein said photo detector means includes driving means for rotating the photo electric sensitive surface in synchronism with the predetermined rotational passage of said successive beam positions.

43. Apparatus for measuring refractive properties of a sphero-cylindrical optical system under test including the measurement of at least one of the spherical power, cylindrical power and cylindrical axis refractive properties in a sphero-cylindrical optical system, said apparatus including:
means for generating a beam of incident light rays rotating about a predetermined line axis at a predetermined rate $f_1$ revolutions per second,
means for positioning said optical system under test in the path of said rotating light beam thereby producing a rotating beam of refracted light rays emanating from said optical system under test,
photo detector means having a photosensitive and position sensitive surface disposed in the path of said refracted light beam for synchronous rotation therewith and for producing an analog electrical output having an instantaneous magnitude representative of the instantaneous relative position at which the refracted light beam strikes the photosensitive surface,
said analog electrical output comprising a composite analog signal having a plurality of predetermined analog signal characteristics, each respectively representative of one of said refractive properties, and electrical processing circuit means connected to receive said electrical output and including means selectively responsive to different ones of said predetermined analog signal characteristics so as to provide an output indication representing said at least one refractive property of the optical system under test.

44. Apparatus as in claim 43 wherein said means for generating includes means causing said beam to converge towards a common point on said photoelectric sensitive surface regardless of its rotational position in the absence of said optical system under test from the path of said light beam.

45. Apparatus as in claim 43 wherein said means for generating includes:
a light beam source providing a first light beam generally coincident with said predetermined line axis, and
beam scanning means disposed in the path of said first light beam for deflecting said first light beam along a beam path generally radially displaced from said predetermined axis and for rotating the thusly deflected light beam through said plurality of successive beam positions.

46. Apparatus as in claim 45 wherein said beam scanning means comprises:
a refractive member having first and second planar surfaces disposed at a predetermined angle with respect to said line axis, and
drive means for rotating said refractive member about said line axis at a predetermined rate of rotation.

47. Apparatus as in claim 46 wherein:
said first and second planar surfaces are inclined with respect to one another sufficiently to cause said deflected light beam to converge toward a common point on said photoelectric sensitive surface in the absence of said optical system under test for all rotational positions of said refractive member.

48. Apparatus as in claim 43 wherein said means for positioning includes:
x-axis adjustment means for effecting x-axis adjustment of the relative positioning between said refracted light beams and said photo detector means along an x-axis dimension to compensate for any x-axis prism refractive properties of said optical system under test,
y-axis adjustment for effecting y-axis adjustment of the relative positioning between said refracted light beams and said photo detector means along a y-axis dimension orthogonal to said x-axis dimension to compensate for any y-axis prism refractive properties of said optical system under test, and
prism power encoding means operatively connected to said x-axis adjustment means and said y-axis adjustment means for sensing the magnitude of such x-axis and y-axis position adjustments and for providing a corresponding x-axis prism output signal and a y-axis prism output signal representative of the prism power of the optical system under test along said x-axis and y-axis dimensions respectively.

49. Apparatus as in claim 48 wherein said means for positioning comprises a mirror surface disposed in the path of said refracted light beams and mounted for rotational movement along two orthogonal axes aligned with said x-axis and y-axis dimensions, and said x-axis adjustment means and said y-axis adjustment means comprise means for independently rotating said mirror surface about its respectively associated orthogonal axes.

50. Apparatus as in claim 43 wherein said electrical processing circuit means includes:
means for providing a composite electrical signal from said electrical output of the photo detector means, said composite signal having a d.c. or average component representative of the average spherical power of said optical system under test and a first a.c. component at $2f_1$ Hz with a magnitude representing the cylindrical power of said optical system under test, the phase of said first a.c. component with respect to the rotational movement of said rotating light beam representing the cylindrical axis of said optical system under test,
synchronization means operatively disposed to provide an electrical synchronization signal synchronized with the cyclic rotational movement of said rotating light beam,
first processing means connected to provide a spherical output signal representative of said d.c. component and thus representative of the average spherical power of said optical system under test,
second processing means connected to provide a cylindrical output signal representative of the magnitude of said first a.c. component and thus representative of the cylindrical power of said optical system under test, and
third processing means connected to compare the phase of said first a.c. component with the phase of said synchronization signal to provide an axis output signal representative of the phase difference therebetween and thus representative of the relative cylindrical axis orientation of said optical system under test.

51. Apparatus as in claim 50 wherein said electrical processing circuit means further includes means for effectively adding substantially one-half of said cylinder output signal to said spherical output signal to provide a final spherical output signal representative of the maximum spherical power of said optical system under test.

52. Apparatus as in claim 50 wherein said electrical processing circuit means further includes means for effectively subtracting substantially one-half of said cylinder output signal to provide a final spherical output signal representative of the minimum spherical power of said optical system under test.

53. Apparatus as in claim 50 wherein said electrical processing circuit means includes means for selectively effectively adding or subtracting substantially one-half of said cylinder output signal to provide a final spherical output signal representative of the maximum or minimum spherical power respectively of the optical system under test.

54. Apparatus as in claim 50 wherein:
said means for providing a composite electrical signal also provides a second a.c. component thereof at $f_1$ Hz having a magnitude representing the prism power of said optical system under test with respect to its effective relative optical position with respect to a predetermined point on said photo detector means and
said electrical processing circuit means includes fourth processing means connected to provide a prism output signal representative of the magnitude of said second a.c. component and thus representative of the prism power of said optical system under test with respect to said relative positioning.

55. Apparatus as in claim 50 wherein:
   said light source means includes means for amplitude modulating said beam of incident light rays at a predetermined frequency $f_2$ Hz where $f_2$ is higher than $4f_1$ Hz, and
   said means for providing a composite electrical signal includes demodulating means for substantially removing the $f_2$ Hz component of amplitude modulation from the electrical output of the photo detector means.

56. Apparatus as in claim 50 wherein said means for providing a composite electrical signal includes normalization means for controlling the magnitude of said composite electrical signal by making it inversely proportioned to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test that are to be measured.

57. Apparatus as in claim 50 wherein at least one of said second and third processing means includes:
   a tracking bandpass frequency filter means having a bandpass frequency which is automatically adjusted to substantially coincide with the $2f_1$ frequency of the first a.c. component in spite of possible deviations therein such as may be caused by corresponding deviations of the speed of said rotation means and changes in electrical circuit parameters thereby minimizing phase changes which would otherwise be introduced in the first a.c. component before it is separated from the composite signal and its phase is compared with said synchronization signal.

58. Apparatus as in claim 50 further comprising analog to digital converter means and digital display means connected to receive said spherical output signal, said cylindrical output signal and said axis output signal and to provide humanly sensible digital output indications respectively corresponding thereto.

59. Apparatus as in claim 53 further comprising analog to digital converter means and digital display means connected to receive said spherical output signal, said cylindrical output signal and said axis output signal and to provide humanly sensible digital output indications respectively corresponding thereto.

60. Apparatus as in claim 50 wherein said second processing means comprises:
   a bandpass frequency filter means having a center frequency passband of $2f_1$ Hz connected to receive said composite signal and to pass only said first a.c. component therethrough;
   a zero crossing detector means connected to said bandpass frequency filter means for detecting the zero crossings of said first a.c. component and producing a control output representative thereof and having a $2f_1$ Hz repetition rate;
   a demodulator connected to receive said first a.c. component and to demodulate same under the control of said control output to produce a varying unidirectional signal having a short term d.c. component representative of the then existing instantaneous magnitude of said first a.c. component, and
   a low pass filter means connected for passing said short term d.c. component as said cylindrical output signal.

61. Apparatus as in claim 60 wherein said first processing means comprises:
   a low pass filter connected for passing said d.c. component of said composite signal; and
   means connected for selectively adding or subtracting one-half said cylindrical output signal to said d.c. component of said composite signal thereby providing said spherical output signal.

62. Apparatus as in claim 60 wherein said third processing means comprises:
   a phase detector means connected to receive said synchronization signal and said control output from said zero crossing detector means and to provide a varying unidirectional signal having a short term d.c. component respective of the phase difference between the two received signals, and
   a low pass filter means connected for passing the short term d.c. component from the phase detector means as said axial output signal.

63. Apparatus as in claim 62 wherein said phase detector means includes means insuring that said short term d.c. component issuing therefrom is substantially zero when the synchronization signal and control outputs are exactly in coincidence and means insuring that the short term d.c. component issuing therefrom always represents an angle within a lower limit of 0° and less than an upper limit of 180°.

64. Apparatus as in claim 50 wherein said photo detector means comprises a liner position sensitive transducer providing first and second transducer signals such that the sum of the first and second transducer signals is proportional to the total light energy incident on the transducer and the difference of the first and second transducer signals is proportional to the position of the centroid of distribution of light energy falling on the transducer, said difference being zero when the centroid coincides with a predetermined point on the transducer.

65. Apparatus as in claim 64 wherein:
   said light source means includes means for amplitude modulating said beam of incident light rays at a predetermined frequency $f_2$ Hz where $f_2$ is higher than $4f_1$ Hz, and
   said means for providing a composite electrical signal includes demodulating means for substantially removing the $f_2$ Hz component of amplitude modulation from the electrical output of the photo detector means.

66. Apparatus as in claim 65 wherein said means for providing a composite signal further comprises:
   sum means for adding said first and second transducer signals and providing a sum signal,
   difference means for subtracting said first and second transducer signals and providing a difference signal,
   zero crossing detector means for detecting the zero crossings of said sum signal and providing a control signal at $f_2$ Hz repetition rate;
   sum demodulation means connected to synchronously demodulate the sum signal under control of said control signal thereby producing a sum signal proportional to the total light energy being transduced by said photo detector means, difference demodulation means connected to synchronously demodulate the difference signal under control of said control signal thereby producing a difference signal proportional to the instantaneous relative position of said centroid on the transducer.

67. Apparatus as in claim 66 further including normalizing means for effectively dividing said difference signal by said sum signal with the resultant constituting said composite signal.

68. Method for measuring refractive properties of a sphero-cylindrical optical system under test including the measurement of at least one of the spherical power, cylindrical power and cylindrical axis refractive properties in a sphero-cylindrical optical system, said method including:

providing a beam of incident light rays emanating along the general direction of a predetermined line axis, positioning said optical system under test in the path of said beam of incident light rays, effecting relative rotational motion at a predetermined rotative frequency $f_1$ between said beam of incident light rays and said optical system under test so as to cause the beam to effectively move about a predefined first locus in the plane of said optical system under test and thereby produce a refracted light beam which moves correspondingly about a second locus in a subsequent plane parallel to the plane of the optical system, said second locus having relative maximum and minimum dimensions representative of the spherical power, cylindrical power, and cylinder axis refractive parameters, disposing a photo detector having a photo-position sensitive surface in the path of said refracted light beam and producing an analog electrical output therefrom having an instantaneous magnitude representative of the instantaneous relative position on said surface at which the refracted light beam strikes the photosensitive surface, said analog electrical output comprising a composite analog signal having a plurality of predetermined analog signal characteristics, each respectively representative of one of said refractive properties, and processing said electrical output by selectively responding to different ones of said predetermined analog signal characteristics so as to provide an output indication representing said at least one refractive property of the optical system under test.

69. Method as in claim 68 wherein said processing step includes synchronously processing said electrical output from the photo detector means with respect to the relative motion being effected by said relative movement means.

70. Method as in claim 68 wherein said disposing a photo detector step includes synchronously moving said photoelectric sensitive surface with respect to the relative motion being effected by said relative movement means.

71. Method as in claim 70 wherein said processing step includes synchronously processing said electrical output from the photo detector with respect to the relative motion being effected.

72. Method as in claim 68 including causing said incident light beam to always converge toward a common point on said photoelectric sensitive surface in the absence of said optical system under test from the light beam path.

73. Method as in claim 68 wherein said positioning step includes:

effecting $x$-axis adjustment of the relative positioning between said light beam and said photo detector along an $x$-axis dimension to compensate for any $x$-axis prism refractive properties of said optical system under test, effecting $y$-axis adjustment of the relative positioning between said light beam and said photo detector means along a $y$-axis dimension orthogonal to said $x$-axis dimension to compensate for any $y$-axis prism refractive properties of said optical system under test, and sensing the magnitude of such $x$-axis and $y$-axis position adjustments and providing a corresponding $x$-axis prism output signal and a $y$-axis prism output signal representative of the prism power of the optical system under test along said $x$-axis and $y$-axis dimensions respectively.

74. Method as in claim 68 wherein said relative motion step includes causing said beam of incident light rays to pass around the locus of a circle in said first plane at a predetermined rotational rate of $f_1$ revolutions per second, and wherein said processing step includes:

providing a composite electrical signal, said composite signal having a d.c. or average component representative of the average spherical power of said optical system under test and a first a.c. component of $2f_1$ Hz with a magnitude representing the cylindrical power of said optical system under test, the phase of said first a.c. component with respect to the predetermined relative motion representing the cylindrical axis of said optical system under test, providing an electrical synchronization signal having cyclic synchronism with the predetermined relative motion, providing a spherical output signal representative of at least said d.c. component and thus representative of the average spherical power of said optical system under test, providing a cylinder output signal representative of the magnitude of said first a.c. component and thus representative of the cylindrical power of said optical system under test, and comparing the phase of said first a.c. component with the phase of said synchronization signal to provide an axis output signal representative of the phase difference therebetween and thus representative of the relative cylindrical axis orientation of said optical system under test.

75. Method as in claim 74 wherein said processing step includes selectively adding or subtracting substantially one-half of said cylinder output signal to provide a final spherical output signal representative of the maximum or minimum spherical power respectively of the optical system under test.

76. Method as in claim 74 wherein:

said providing a composite electrical signal step also provides a second a.c. component thereof at $f_1$ Hz having a magnitude representing the prism power of said optical system under test with respect to its effective relative optical position with respect to a predetermined point on said photo detector means and said processing step includes providing a prism output signal representative of the magnitude of said second a.c. component and thus representative of the prism power of said optical system under test with respect to its existing effective relative positioning.

77. Method as in claim 74 further comprising:
amplitude modulating said beam of incident light rays at a predetermined frequency $f_2$ Hz where $f_2$ is higher than $4f_1$ Hz, and wherein
said providing a composite electrical signal step includes removing the $f_2$ Hz component of amplitude modulation from the electrical output of the photo detector.

78. Method as in claim 74 wherein said providing a composite electrical signal step includes controlling the magnitude of said composite electrical signal by making it inversely proportional to the total amount of light energy from said refracted beams striking said photo detector means thereby automatically compensating for possible changes in the total output from said light source means, in the transmissivity of the optical system under test and in other factors which can from time to time possibly cause changes in the amplitude of the electrical output from the photo detector means unrelated to the refractive properties of the optical system under test.

79. Method as in claim 74 wherein at least one of said processing steps includes:
providing a bandpass frequency which is automatically adjusted to substantially coincide with the $2f_1$ Hz frequency of the first a.c. component in spite of possible deviations therein such as may be caused by corresponding deviations of the speed of said relative movement means and changes in electrical circuit parameters thereby minimizing phase changes which would otherwise be introduced in the first a.c. component before it is separated from the composite signal and its phase is compared with said synchronization signal.

80. Method as in claim 74 further comprising providing analog to digital converter means and digital display means connected to receive at least one of said spherical output signal, said cylindrical output signal and said axis output signal and providing a humanly sensible digital output indication corresponding thereto.

* * * * *